(12) United States Patent
Yamamoto et al.

(10) Patent No.: US 10,956,547 B2
(45) Date of Patent: Mar. 23, 2021

(54) BIOMETRICS AUTHENTICATION SYSTEM

(71) Applicant: SONY CORPORATION, Tokyo (JP)

(72) Inventors: Kenji Yamamoto, Kanagawa (JP); Hideo Sato, Tokyo (JP); Isao Ichimura, Tokyo (JP); Toshio Watanabe, Kanagawa (JP); Shinichi Kai, Tokyo (JP); Junji Kajihara, Tokyo (JP); Kengo Hayasaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 16/151,878

(22) Filed: Oct. 4, 2018

(65) Prior Publication Data

US 2019/0042721 A1  Feb. 7, 2019

Related U.S. Application Data

(62) Division of application No. 12/458,933, filed on Jul. 28, 2009, now abandoned.

(30) Foreign Application Priority Data

Aug. 4, 2008 (JP) .................. 2008-200532
Jun. 19, 2009 (JP) .................. 2009-146189

(51) Int. Cl.
*G06F 21/32* (2013.01)
*G06K 9/00* (2006.01)
*G06K 9/20* (2006.01)

(52) U.S. Cl.
CPC ......... *G06F 21/32* (2013.01); *G06K 9/00033* (2013.01); *G06K 9/2027* (2013.01);
(Continued)

(58) Field of Classification Search
CPC .. G06F 21/32; G06K 9/00033; G06K 9/2027; G06K 9/00885; G06K 2009/00932; G06K 2209/05
See application file for complete search history.

(56) References Cited

U.S. PATENT DOCUMENTS 5,726,443 A * 3/1998 Immega .............. H03K 17/941
                                                250/227.2
6,011,860 A     1/2000 Fujieda et al.
(Continued)

FOREIGN PATENT DOCUMENTS

JP    10-289304 A    10/1998
JP    2001-141423 A   5/2001
(Continued)

OTHER PUBLICATIONS

Office Action for JP Patent Application No. 2009-146189, dated Jul. 27, 2010.
(Continued)

*Primary Examiner* — Jeff Piziali
(74) *Attorney, Agent, or Firm* — Chip Law Group

(57) ABSTRACT

A biometrics authentication system having a small and simple configuration and being capable of implementing both of biometrics authentication and position detection is provided. A biometrics authentication system includes a light source emitting light to an object, a microlens array section condensing light from the object, a light-sensing device obtaining light detection data of the object on the basis of the light condensed by the microlens array section, a position detection section detecting the position of the object on the basis of the light detection data obtained in the light-sensing device, and an authentication section, in the case where the object is a living body, performing authen-
(Continued)

tication of the living body on the basis of the light detection data obtained in the light-sensing device.

5 Claims, 22 Drawing Sheets

(52) U.S. Cl.
CPC ............... *G06K 9/00885* (2013.01); *G06K 2009/00932* (2013.01); *G06K 2209/05* (2013.01)

(56) References Cited

U.S. PATENT DOCUMENTS

| | | | |
|---|---|---|---|
| 6,314,197 B1* | 11/2001 | Jain | ............... G06K 9/00087 382/125 |
| 6,400,836 B2 | 6/2002 | Senior | |
| 6,876,762 B1 | 4/2005 | Ono | |
| 7,760,916 B2* | 7/2010 | Sato | ............... G06K 9/00033 382/115 |
| 7,873,408 B2 | 1/2011 | Sato | |
| 2002/0054695 A1 | 5/2002 | Bjorn et al. | |
| 2006/0023197 A1* | 2/2006 | Joel | ............... G03B 35/24 355/77 |
| 2007/0122014 A1* | 5/2007 | Sato | ............... G06K 9/3275 382/124 |
| 2007/0273658 A1* | 11/2007 | Yli-Nokari | ......... G06F 3/03547 345/173 |
| 2008/0159599 A1* | 7/2008 | Kajihara | ............ G06K 9/00046 382/115 |
| 2008/0316323 A1* | 12/2008 | Morita | ................. G06K 9/0004 348/222.1 |
| 2009/0093727 A1 | 4/2009 | Sato | |
| 2011/0062331 A1 | 3/2011 | Sato | |

FOREIGN PATENT DOCUMENTS

| | | | |
|---|---|---|---|
| JP | 2005-312748 A | 11/2005 | |
| JP | 2005-323892 A | 11/2005 | |
| JP | 2006-092428 A | 4/2006 | |
| JP | 2006-181296 A | 7/2006 | |
| JP | 2007-264958 A | 10/2007 | |
| JP | 2007-325793 A | 12/2007 | |
| JP | 2009-110452 A | 5/2009 | |
| JP | 2010-035560 A | 2/2010 | |
| WO | 2008/004314 A1 | 1/2008 | |

OTHER PUBLICATIONS

Office Action for JP Patent Application No. 2009-146189, dated Nov. 24, 2010.
Non-Final Office Action for U.S. Appl. No. 12/458,933, dated Sep. 25, 2015, 12 pages.
Advisory Action for U.S. Appl. No. 12/458,933, dated Dec. 10, 2012, 03 pages.
Final Office Action for U.S. Appl. No. 12/458,933, dated Oct. 16, 2012, 39 pages.
Non-Final Office Action for U.S. Appl. No. 12/458,933, dated Apr. 20, 2012, 25 pages.

* cited by examiner

BIOMETRICS AUTHENTICATION SYSTEM

CROSS REFERENCE TO RELATED APPLICATIONS

This application is a divisional of U.S. patent application Ser. No. 12/458,933 filed on Jul. 28, 2009, which claims the benefit of priority from Japanese Patent Application No. JP 2009-146189 filed in the Japan Patent Office on Jun. 19, 2009, and from Japanese Patent Application No. JP 2008-200532 filed in the Japan Patent Office on Aug. 4, 2008. Each of the above-referenced applications is hereby incorporated herein by reference in its entirety.

BACKGROUND OF THE INVENTION

1. Field of the Invention

The present invention relates to a biometric authentication system using a light-sensing device.

2. Description of the Related Art

In related arts, image pickup apparatuses picking up an image of a structure in a living body part are used in biometrics authentication systems or the like. Typically, as such an image pickup apparatus has a large thickness, the image pickup apparatus is arranged outside an apparatus to which the image pickup apparatus is applied, or an optical system and a detection system are independently arranged as described in Japanese Unexamined Patent Application Publication Nos. 2005-312748 and 2006-181296. However, in recent years, according to a reduction in sizes or profiles of various apparatuses, constraints of manufacturability or design, or the like, a reduction in the size and profile of the above-described biometrics authentication system is desired, and it is desired to mount the biometric authentication system in an apparatus.

Therefore, as described in, for example, Japanese Unexamined Patent Application Publication No. 2005-323892, a finger vein authentication system in which authentication of a living body is performed through the use of a finger vein pattern is proposed as a small module. In the finger vein authentication apparatus in Japanese Unexamined Patent Application Publication No. 2005-323892, light sources emitting near-infrared light are arranged at both ends of a light-sensing device (an image sensor) to illuminate a finger from below, and the light-sensing device detects scattered light inside the finger. At this time, the near-infrared light is absorbed by hemoglobin in veins, so a vein pattern is detected by detecting the scattered light. In addition, a fingerprint authentication apparatus using a gradient-index lens array to reduce its profile is also proposed as described in, for example, Japanese Unexamined Patent Application Publication No. H10-289304.

SUMMARY OF THE INVENTION

On the other hand, various apparatuses including a touch pad or a touch panel such as, for example, cellular phones have been put to practical use. The touch pad or the touch panel detects the position of a fingertip, a pen (a stylus) or the like, thereby inputting through the touch pad or the touch panel is allowed, and as position detection means, various position sensors such as, for example, a pressure-sensitive position sensor and an electrostatic position sensor are used.

Moreover, recently, according to diversification of apparatuses, the development of multifunctional biometrics authentication systems having a position detection function by the touch panel or the like is desired. However, when both of the touch panel and the biometrics authentication system are mounted in one apparatus, the whole configuration of the apparatus is complicated and large, and in particular, it is difficult to apply them to a small apparatus such as a cellular phone. Moreover, it is difficult to configure or arrange an illumination means so as to be used for both of the touch panel and the biometrics authentication system.

It is desirable to provide a biometrics authentication system having a small and simple configuration and being capable of implementing both of authentication of a living body and position detection of an object.

According to an embodiment of the invention, there is provided a biometrics authentication system including: a light source emitting light to an object; a microlens array section condensing light from the object; a light-sensing device obtaining light detection data of the object on the basis of the light condensed by the microlens array section; a position detection section detecting the position of the object on the basis of the light detection data obtained in the light-sensing device; and an authentication section, in the case where the object is a living body, performing authentication of the living body on the basis of the light detection data obtained in the light-sensing device.

In the biometrics authentication system according to the embodiment of the invention, light applied from the light source to the object is condensed by the microlens array section, and then is detected by the light-sensing device. Thereby, light detection data of the object is obtained. On the basis of the light detection data obtained in such a manner, the position detection section detects the position of the object, and in the case where the object is a living body, the authentication section performs authentication of the living body.

In the biometrics authentication system according to the embodiment of the invention, light applied from the light source to the object is condensed by the microlens array section, and then is detected by the light-sensing device, thereby the light detection data is obtained. On the basis of the light detection data, authentication of the living body by the authentication section and position detection of the object by the position detection section are performed, so it is not necessary to separately arrange various position sensors. Therefore, the biometrics authentication system with a small and simple configuration may implement both of biometrics authentication and position detection.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
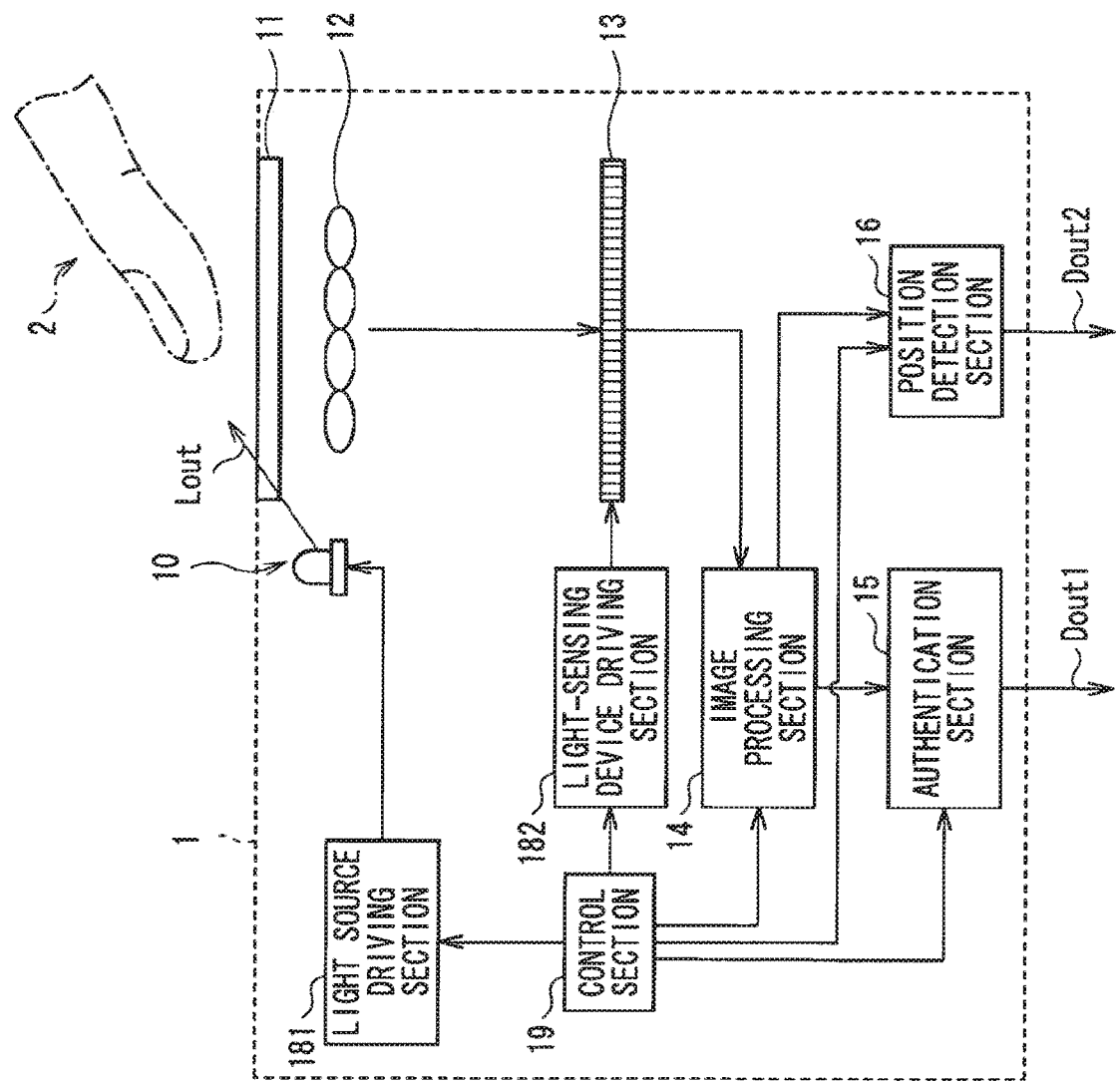
FIG. 1 is an illustration of the whole configuration of a biometrics authentication system according to a first embodiment of the invention.
Figure 2A:
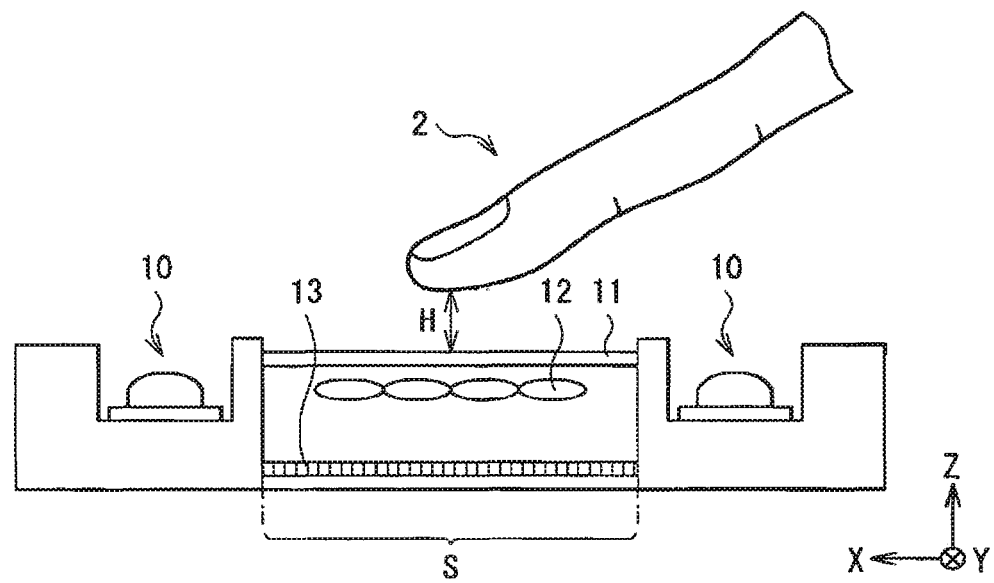
FIGS. 2A and 2B are schematic sectional views of the configurations of main parts of the biometrics authentication system illustrated in FIG. 1.
Figure 2B:
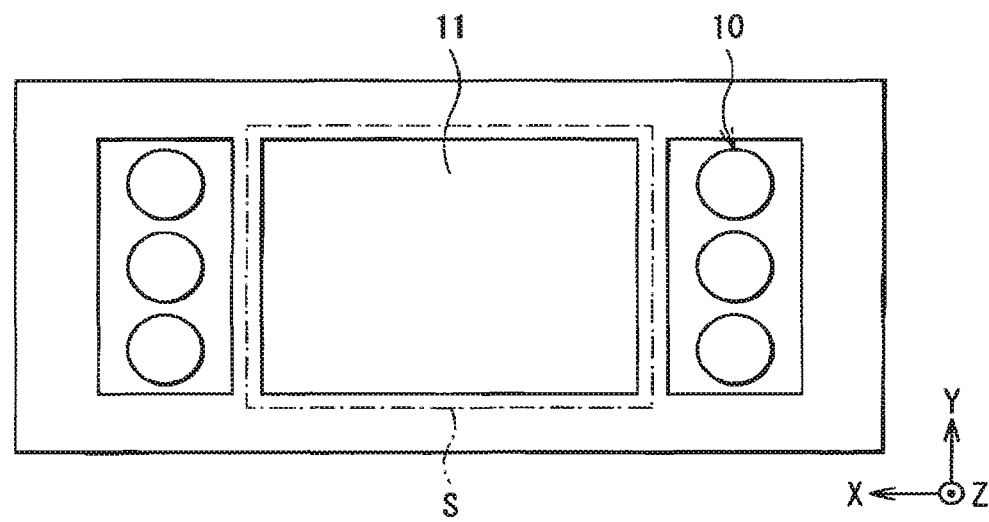

FIG. 1 illustrates the whole configuration of a biometrics authentication system (a biometrics authentication system 1) according to a first embodiment of the invention. FIG. 2A is a schematic sectional view of the configuration of a main part of the biometrics authentication system 1, and FIG. 2B is a schematic view of the biometrics authentication system 1 viewed from above. The biometrics authentication system 1 outputs authentication result data Dout1 of a living body (for example, a fingertip) 2 as an object subjected to image pickup, and outputs position data Dout2 of the living body 2. The biometrics authentication system 1 includes a near-infrared light source 10, a cover glass 11, a microlens array 12, a light-sensing device 13, an image processing section 14, an authentication section 15, a position detection section 16, a light source driving section 181, a light-sensing device driving section 182 and a control section 19.

The near-infrared light source 10 is a light source applying light in a near-infrared region (hereinafter simply referred to as near-infrared light) to the living body 2 as the object subjected to image pickup. For example, as illustrated in FIG. 2B, a plurality of (three for each side in FIG. 2B) near-infrared light sources 10 are arranged along two opposed sides in a Y-axis direction of a rectangular image pickup region S in which the cover glass 11, the microlens array 12 and the light-sensing device 13 are arranged. The near-infrared light sources 10 each are made of, for example, an LED (Light Emitting Diode) or the like. In addition, the near-infrared light is, for example, light in a wavelength region of approximately 700 nm to 1200 nm. In the case where light in such a wavelength region is used, when vein authentication of the living body 2 is performed, light use efficiency may be further improved by a balance between the transmittance through the living body 2 and the absorption into reduced hemoglobin (veins) in the living body 2.

The cover glass 11 protects the interior of the biometrics authentication system. 1, and is a section which is a contact point with the living body 2.

The microlens array 12 includes a plurality of microlenses arranged in a matrix form, and is arranged below the cover glass 11. Each microlens functions as an image pickup lens for the living body 2 as the object subjected to image pickup.

The light-sensing device 13 obtains light detection data on the basis of light condensed by each microlens of the microlens array 12. The light-sensing device 13 is arranged on a focal plane of the microlens array 12, and a plurality of pixels are allocated to one microlens. The light-sensing device 13 includes, for example, a plurality of light-sensing pixels such as a plurality of CCDs (Charge Coupled Devices) arranged in a matrix form. In the embodiment, the light-sensing device 13 is arranged all over the image pickup region S.

The image processing section 14 performs predetermined image processing on the light detection data obtained in the light-sensing device 13 in response to the control of the control section 19 to produce image processing data of the living body 2, and then output the image processing data to the authentication section 15 and the position detection section 16. In addition, the image processing data outputted to the authentication section 15 and the image processing data outputted to the position detection section 16 may be the same as or different from each other. Moreover, the image processing section 14, and the authentication section 15, the position detection section 16 and the control section 19 all of which will be described later each include, for example, a microcomputer or the like.

The authentication section 15 performs authentication (vein authentication in the embodiment) of the living body 2 by comparing an image processing data pattern inputted from the image processing section 14 to a biometrics authentication pattern stored in a pattern storing section (not illustrated) in response to the control of the control section 19. The pattern storing section is a section storing a biometric authentication pattern obtained by picking up an image of the living body 2 in advance, and includes a nonvolatile memory device (for example, an EEPROM (Electrically Erasable Programmable Read Only Memory) or the like). A result obtained by the authentication section 15 is outputted to outside as authentication result data Dout1.

The position detection section 16 detects the position (x, y, z) of the living body 2 on the basis of the image processing data inputted from the image processing section 14 in response to the control of the control section 19. Position information detected by the position detection section 16 is outputted to outside as position data Dout2.

The light source driving section 181 drives the near-infrared light sources 10 to emit light in response to the control of the control section 19. The light-sensing device driving section 182 drives the light-sensing device 13 to pick up an image (to detect light) in response to the control of the control section 19.

The control section 19 controls the operations of the image processing section 14, the authentication section 15, the light source driving section 181 and the light-sensing device driving section 182 as appropriate.

Next, functions and effects of the above-described biometrics authentication system 1 will be described below.

In the biometrics authentication system 1, when the living body (for example, a fingertip) 2 comes into contact with or comes close to the cover glass 11, the near-infrared light sources 10 are driven by the light source driving section 181 to emit light Lout. The light applied to the living body 2 is condensed by the microlens array 12, and then detected in the light-sensing device 13. Thereby, in the light-sensing device 13, the light detection data of the living body 2 is obtained, and the light detection data is outputted to the image processing section 14.

Figure 3:
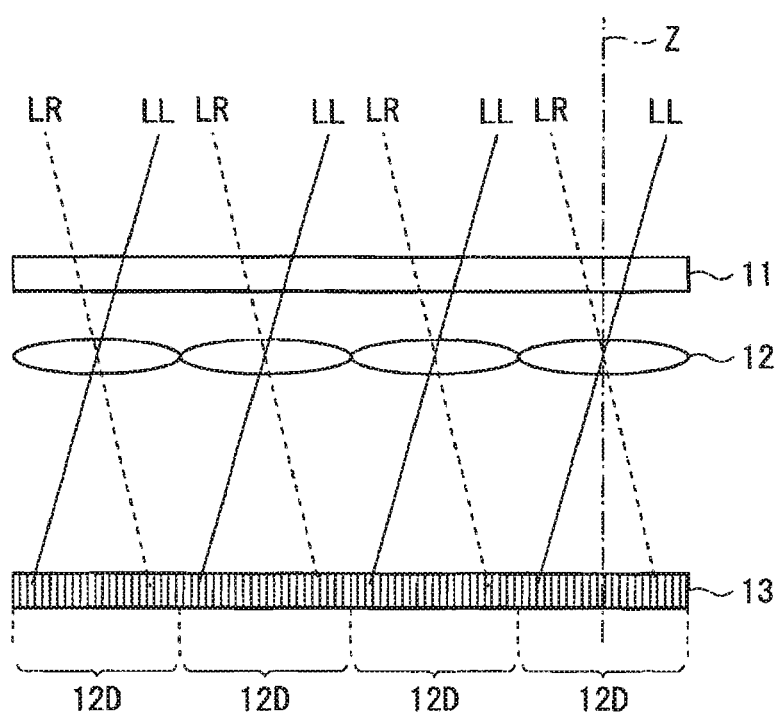
FIG. 3 is an illustration for describing light detection data obtained by a lightsensing device illustrated in FIG. 1.
Figure 4A:
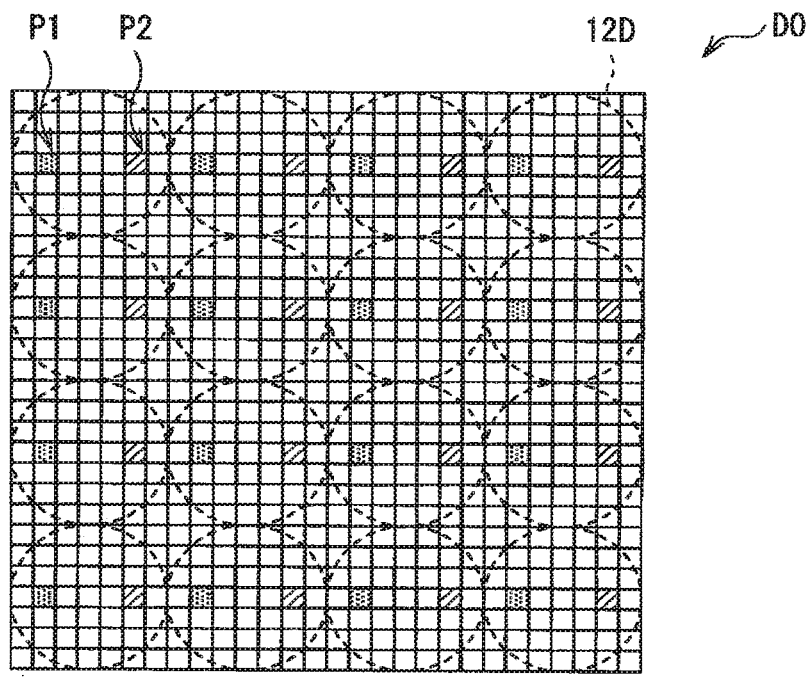
FIGS. 4A, 4B, and 4C are schematic views of two-dimensional configurations of the light detection data obtained by the light-sensing device illustrated in FIG. 1.
Figure 4B:
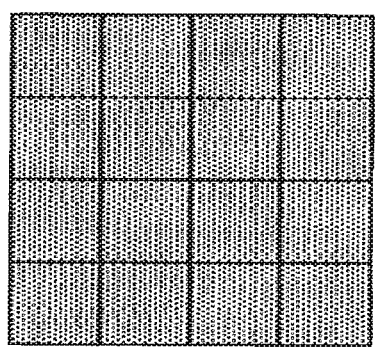
Figure 4C:
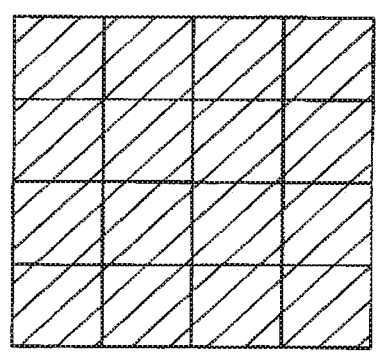

Now, referring to FIG. 3 to FIGS. 4A, 4B, and 4C, specific operation of the image processing section 14 will be described below. FIG. 3 schematically illustrates an optical path reaching the light-sensing device 13 from the living body 2. FIG. 4A schematically illustrates a two-dimensional configuration of light detection data D0 obtained in the light-sensing device 13. FIGS. 4B and 4C schematically illustrate two dimensional configurations of parallax image data DL and DR produced on the basis of the light detection data D0, respectively.

In the image processing section 14, two right and left parallax images are produced on the basis of inputted light detection data. In this case, as illustrated in FIG. 3, in the above-described light-sensing device 13; a light-sensing region 12D for each microlens is formed, and each light ray keeping information on the traveling direction thereof is detected. Moreover, pixel data in pixels arranged at the same position in the light-sensing regions 12D include information on the same traveling direction. The image processing section 14 produces parallax images of at least two light rays, for example, incident light rays LL and LR from the left and right direction with respect to an optical axis Z of light rays received in the light-sensing regions 12D.

Figure 5A:
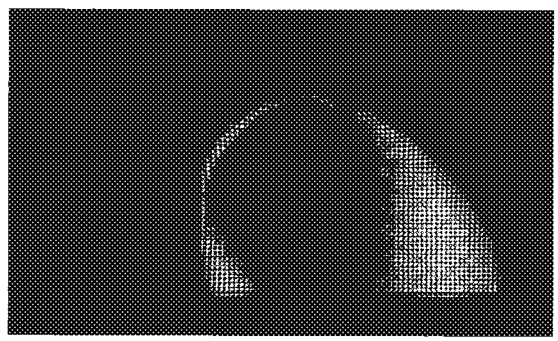
FIG. 5A is an actually picked-up image of a finger.
Figure 5A:
Figure 5B:
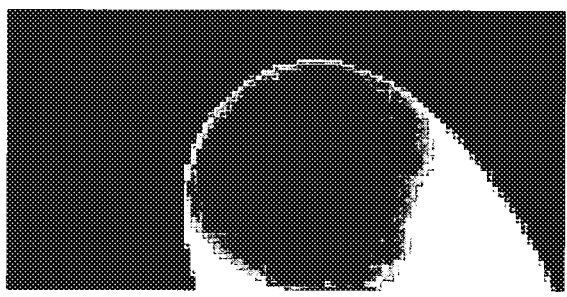
FIGS. 5B and 5C are parallax images obtained from FIG. 5A.
Figure 5C:
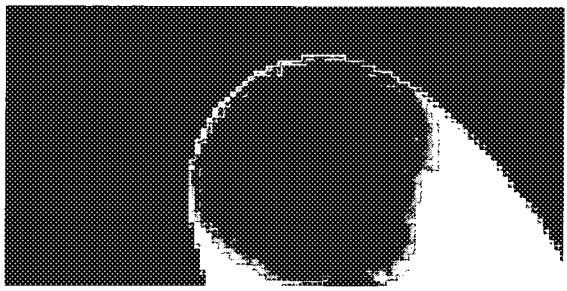

More specifically, first, in the light detection data D0, pixel data P1 in pixels where the light ray LL is received (in FIG. 4A, pixel data in pixels at the same position (black parts) in the light-sensing regions 12D) are extracted from the light-sensing regions 12D, and then these extracted pixel data P1 are synthesized (refer to FIG. 4B). Likewise, pixel data P2 (in shaded parts in FIG. 4A) corresponding to the light ray LR are extracted from the light-sensing regions 12D, and then these extracted pixel data P2 are synthesized (refer to FIG. 4C). Thereby, left and right parallax image data DL and DR are produced. FIG. 5A illustrates an actually picked-up image, and FIGS. 5B and 5C illustrate parallax images produced from the picked-up image in FIG. 5A.

The parallax image data DL and DR produced in the above-described manner are subjected to another image processing, for example, a defect correction process or a noise reduction process as necessary, and then the parallax image data DL and DR are outputted to the authentication section 15 and the position detection section 16 as image processing data.

In the authentication section 15, vein authentication is performed by comparing a vein pattern on the basis of the inputted image processing data to an authentication pattern stored in advance. Thereby, a biometrics authentication process is completed, and a result by the biometrics authentication process is outputted to outside as an authentication result Dout1.

Figure 6A:
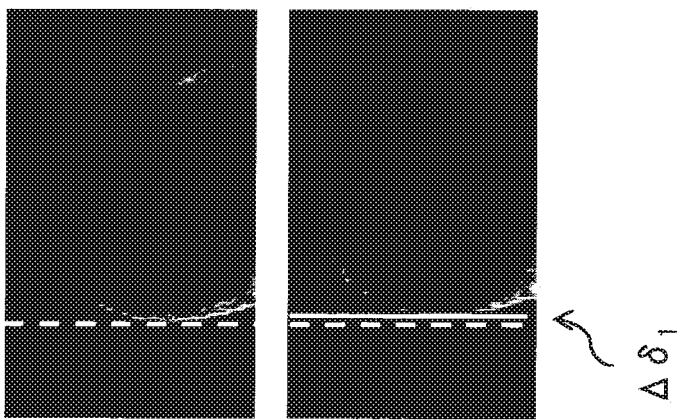
FIGS. 6A, 6B, and 6C are parallax images for describing position detection operation in a position detection section illustrated in FIG. 1.
Figure 6B:
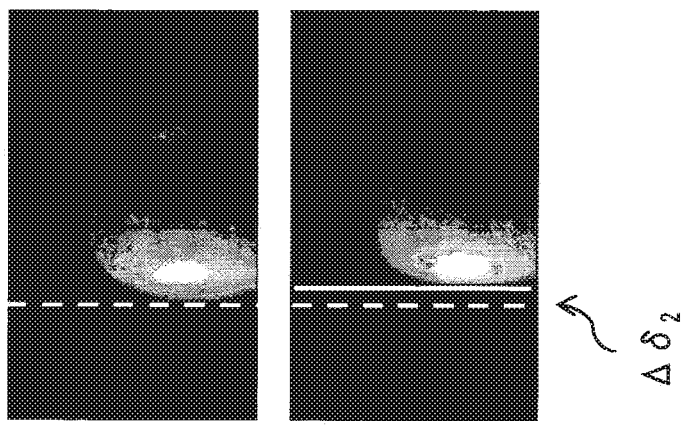
Figure 6C:
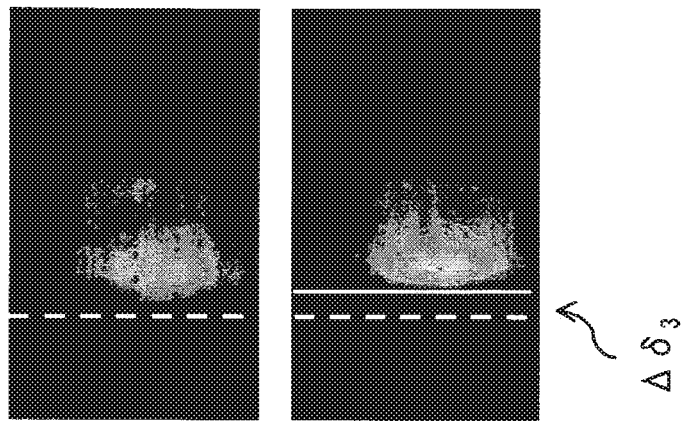

On the other hand, in the position detection section 16, the position (x, y, z) of the living body 2 is detected on the basis of inputted image processing data. For example, the position (x, y) of the living body 2 is detected by performing an edge detection process on one parallax image data of the living body 2. On the other hand, the z component (height) of the living body 2 is specified by, for example, the following technique. A phase difference between living body images in two parallax images is calculated on the basis of a correlation between the left and right parallax data DL and DR corresponding to the image processing data, and the position in a z direction (a height H in FIG. 2) of the living body 2 is specified on the basis of the phase difference. FIGS. 6A, 6B, and 6C illustrate right and left parallax images in the case where the height H is 0 mm, 5 mm and 10 mm. As illustrated in FIGS. 6A, 6B, and 6C, phase differences (A81, A82 and A83) between the phases of the living body 2 in the right and left parallax images are detected by, for example, the edge detection process. At this time, as the height of the living body 2 is reduced, that is, as the living body 2 comes closer to the cover glass 11, the phase difference between the phases of the living body 2 in two parallax images is reduced. (A83>A82>A81). Therefore, when the phase difference between the phases of the living body 2 in two parallax images is detected on the basis of the correlation between the right and left parallax images, the z component of the living body 2 is specified. Thereby, for example, the case of Z=0, that is, the case where the living body 2 is in contact with the cover glass 11 is detectable.

Moreover, the movement of the living body 2 in a horizontal plane (an XY plane) is detected as will be described below. For example, a plurality of parallax image data of the living body 2 are successively produced, and the edge detection process is performed on each of the plurality of parallax image data to calculate the movement amount of the living body 2, thereby the movement of the living body 2 is detected.

Information on the position (x, y, z) of the living body 2 detected in the position detection section 16 in such a manner is outputted to outside as position data Dout2.

As described above, in the embodiment, light applied from the near-infrared light sources 10 to the living body 2 is condensed by the microlens array 12, and then the light is detected in the light-sensing device 13, thereby the light detection data is obtained. The image processing section 14 produces the left and right parallax image data DL and DR on the basis of the obtained light detection data, and outputs the left and right parallax image data DL and DR to the authentication section 15 and the position detection section 16 as image processing data. On the basis of the image processing data supplied in such a manner, the authentication section 15 performs authentication of the living body 2 and the position detection section 16 detects the position of the living body 2. In other words, authentication by the authentication section 15 and position detection by the position detection section 16 are performed by shared light sources and a shared detection optical system (the microlens array 12 and the light-sensing device 13), so both of a biometrics authentication function and a position detection function are implemented without separately arranging, for example, a position sensor such as a pressure-sensitive sensor or an electrostatic sensor. Therefore, the biometrics authentication system 1 is allowed to implement both of biometrics authentication and position detection with a small and simple configuration. Moreover, in particular, an illumination means is used for both of biometrics authentication and position detection, so a cost reduction is achieved.

Further, when authentication is performed through the use of veins of a living body, a higher level of security is obtained, compared to the case where a fingerprint is used, because veins are a structure inside a finger, so veins are resistant to change due to aging, injury or the like, and are resistant to forgery.

Typically, to obtain a vein pattern necessary for authentication, it is necessary to secure a large image pickup area, for example, an area of approximately 30 mm×15 mm, compared to the case where a fingerprint pattern is used. Therefore, in the case where a biometrics authentication system using veins is arranged together with a touch panel or a touch pad, it is necessary to secure an image pickup space for the above-described vein authentication in addition to a space for the touch panel or the touch pad, thereby the size of the whole apparatus is increased.

On the other hand, in the embodiment, the biometrics authentication system 1 has both of the biometrics authentication function and the position detection function with a small and simple configuration. Therefore, as will be described in detail later, it is not necessary to independently arrange a space for the touch panel or the like and an image pickup space for biometrics authentication. Therefore, in the case where the biometrics authentication system 1 functions as a touch panel or the like while performing vein authentication, an increase in the size of the whole apparatus is prevented. Therefore, a small biometrics authentication system with a high level of security is achieved.

Modification 1

Figure 7:
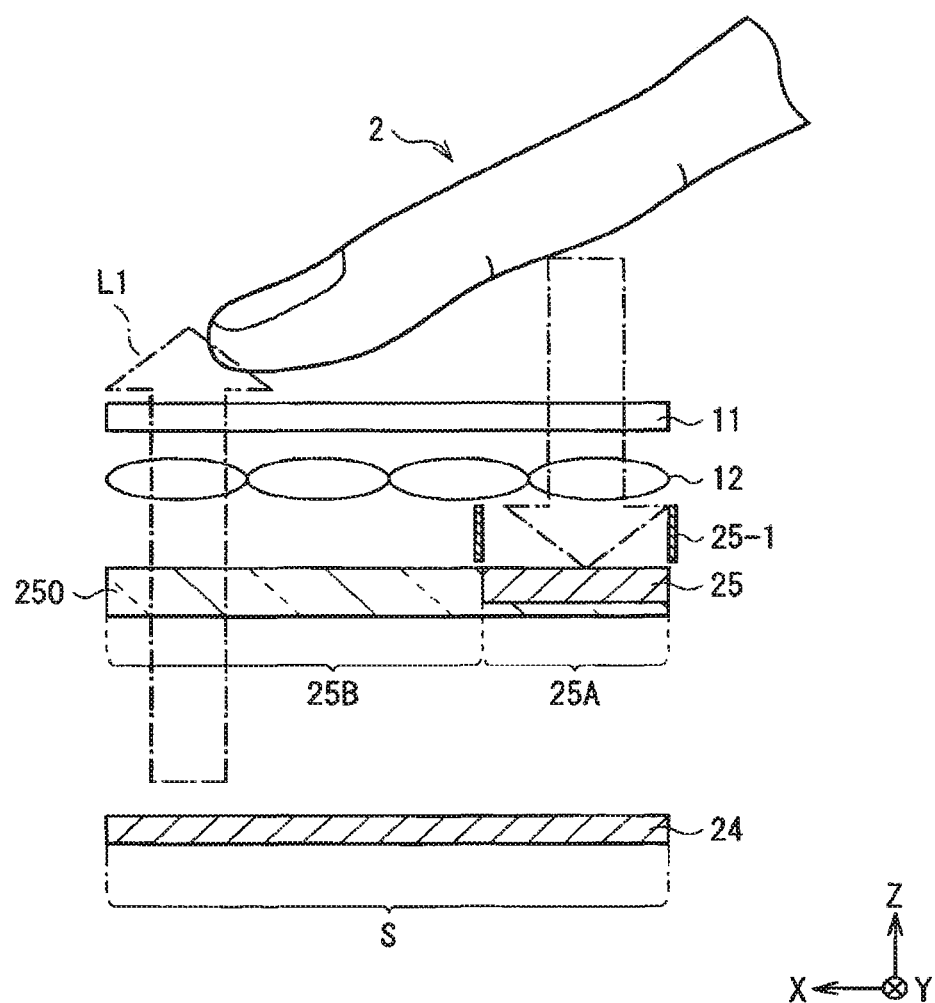
FIG. 7 is a schematic sectional view of the configuration of a main part of a biometrics authentication system according to Modification 1.

FIG. 7 is a schematic sectional view of the configuration of a main part of a biometrics authentication system according to Modification 1 of the first embodiment. The biometrics authentication system according to the modification has the same configuration as that of the biometrics authentication system 1 according to the first embodiment except for the configurations of the light source and the light-sensing device. Therefore, like components are denoted by like numerals as of the biometrics authentication system 1 and will not be further described.

In the modification, a light-sensing device 25 and a backlight 24 are arranged below the microlens array 12. The backlight 24 is a light source emitting near-infrared light and light in a visible region (hereinafter simply referred to as visible light), for example, white light, and includes, for example, a plurality of CCFLs (Cold Cathode Fluorescent Lamps) or LEDs arranged. The light-sensing device 25 is arranged on the focal plane of the microlens array 12 as in the case of the above-described light-sensing device 13, and includes CCDs or the like. A light-shielding section 25-1 for preventing the entry of stray light into the light-sensing device 25 is arranged between the light-sensing device 25 and the microlens array 12. However, in the modification, the light-sensing device 25 is arranged only in a partial region (a light-sensing region 25A) of a transparent substrate 250, and a region where the light-sensing device 25 is not arranged is a transmission region 25B allowing light from the backlight 24 to pass therethrough upward.

In such a configuration, light L1 emitted from the backlight 24 passes through the transmission region 25B of the transparent substrate 250 to be emitted to above the cover glass 11. When the living body 2 is irradiated with the light L1, the light L1 is condensed by the microlens array 12, and then is detected in the light-sensing device 25. Thereby, the light detection data of the living body 2 is obtained, and as in the case of the above-described biometrics authentication system 1, on the basis of the light detection data, the authentication section 15 performs authentication of the living body 2, and the position detection section 16 detects the position of the living body 2. Therefore, the same effects as those in the above-described biometrics authentication system 1 are obtained.

As described above, the shape or arrangement of the light source for applying light to the living body 2 is not specifically limited. Moreover, in the above-described embodiment and the modification, as the light source, the near-infrared light sources 10 and the backlight 24 emitting white light and near-infrared light are described as examples, but the configuration of the light source is not limited thereto. For example, in the case where authentication using a fingerprint is performed as biometrics authentication, a light source emitting at least visible light may be used.

In addition, the number of the light-sensing regions 25A on the transparent substrate 250, or the area, shape or the like of the light-sensing region 25A is not specifically limited. Moreover, one light-sensing region 25A may include one pixel or a plurality of pixels. Further, in the light-sensing region 25A, the number of pixels allocated to each microlens is not specifically limited. However, to produce two right and left parallax image data in the image processing section 14, at least 2 pixels are allocated to one microlens.

Modification 2

Figure 8:
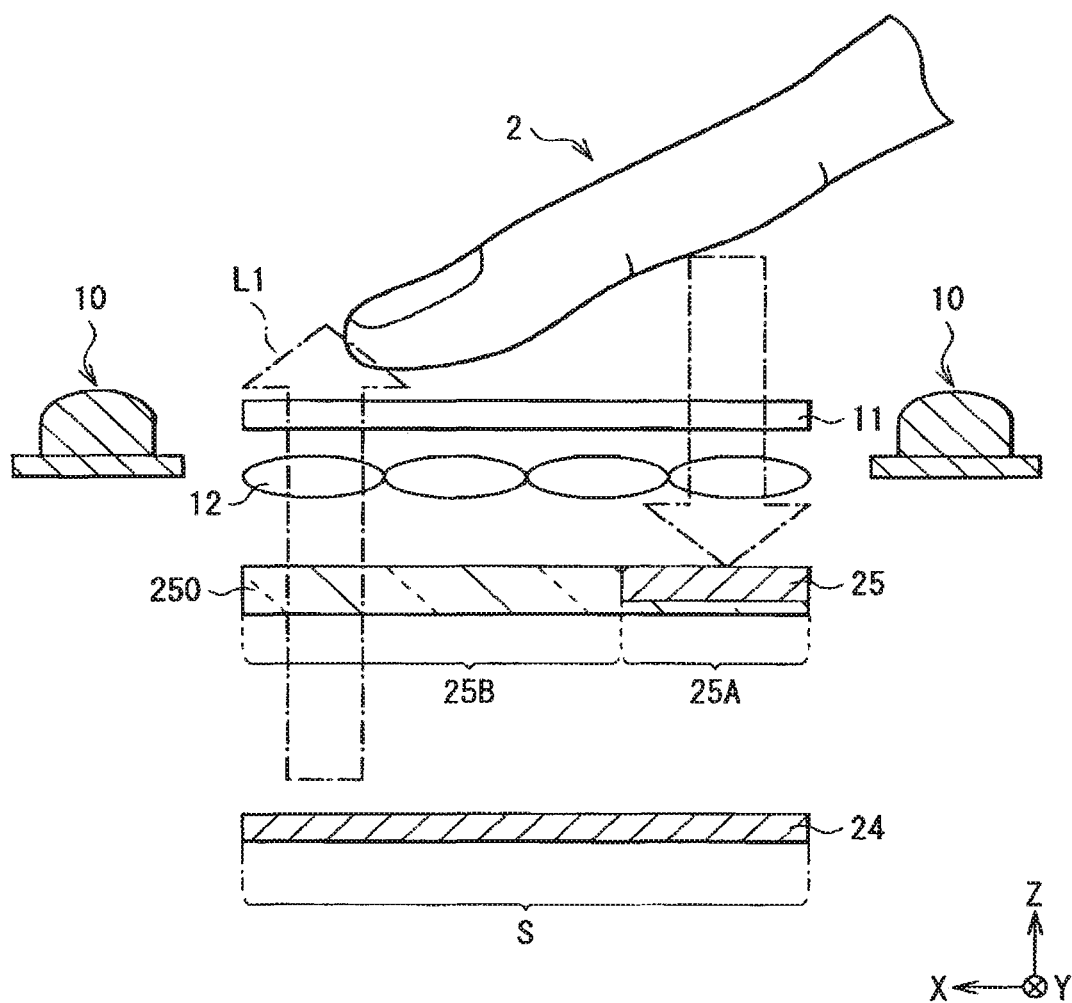
FIG. 8 is a schematic sectional view of the configuration of a main part of a biometrics authentication system according to Modification 2.

FIG. 8 is a schematic sectional view of the configuration of a main part of a biometrics authentication system according to Modification 2 of the first embodiment. The biometrics authentication system according to the modification has the same configuration as those of the first embodiment and Modification 1, except that both of the near-infrared light sources 10 used in the first embodiment and the backlight 24 used in Modification 1 are arranged. However, the near-infrared light sources 10 function as light sources for biometrics authentication, and the backlight 24 functions as a light source for position detection.

Thereby, in biometrics authentication, near-infrared light from the near-infrared light sources 10 is used to produce light detection data for authentication, and in position detection, light from the backlight 24 is used to produce light detection data for position detection. The light detection data for biometrics authentication or position detection produced in such a manner is supplied to the image processing section 14 in the first embodiment. In the image processing section 14, the right and left parallax image data DR and DL are produced by the same technique as that described above.

Then, the produced parallax image data DR and DL are supplied to the authentication section 15 or the position detection section 16, and biometrics authentication or position detection is performed by the same technique as that described above.

As described above, light sources for biometrics authentication and position detection may be separately arranged as light sources for applying light to the living body 2. In this case, the light sources are separately arranged, but biometrics authentication and position detection are performed by a shared detection optical system (the microlens array 12 and the light-sensing device 25), so effects substantially equivalent to the above-described effects are obtained.

Modification 3

Figure 9:
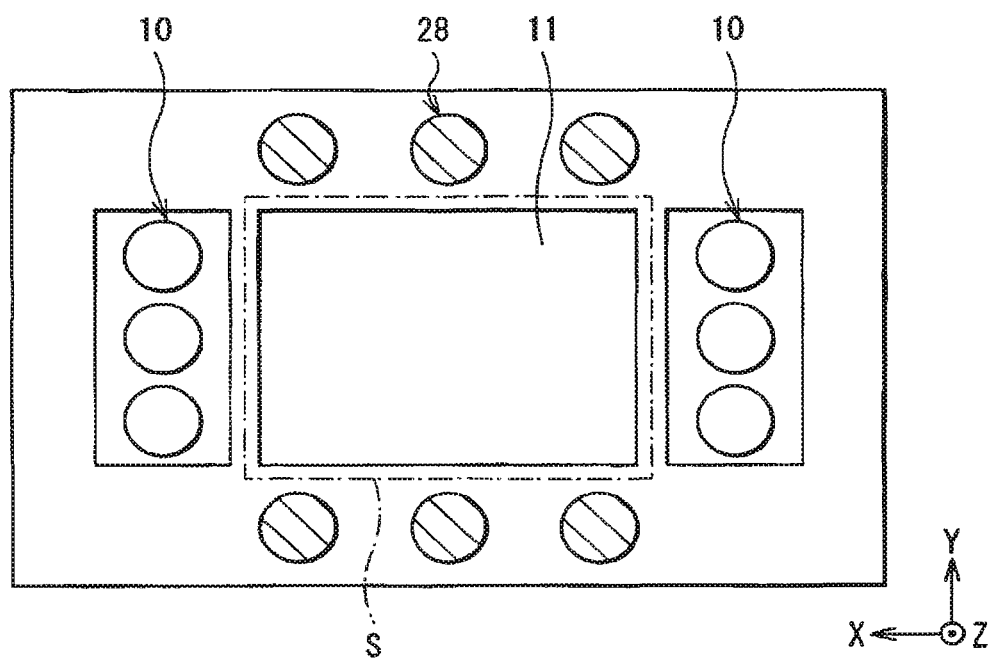
FIG. 9 is a schematic sectional view of the configuration of a main part of a biometrics authentication system according to Modification 3.

FIG. 9 is a schematic view of a biometrics authentication system according to Modification 3 of the first embodiment viewed from above (from the cover glass 11 side). The biometrics authentication system according to Modification 3 has the same configuration as that of the biometrics authentication system according to the first embodiment except for the configurations of the light sources. In the modification, a plurality of (three for each side in the modification) near-infrared light sources 10 for biometrics authentication are arranged along two opposed sides in a Y-axis direction of four sides of the rectangular image pickup region S, and a plurality of (three for each side in the modification) of visible light sources 28 for position detection are arranged two opposed sides in an X-axis direction. The visible light sources 28 each are made of, for example, an LED emitting visible light or the like. In such a configuration, as in the case of Modification 2, in the light-sensing device 13, in biometrics authentication, near-infrared light is applied to the living body 2 to obtain light detection data for authentication, and in position detection, visible light is applied to the living body 2 to obtain light detection data for position detection.

As described above, the near-infrared light sources 10 for biometrics authentication and the visible light sources 28 for position detection may be arranged on a common plane above the biometrics authentication system. Thereby, effects substantially equivalent to those of the biometrics authentication system 1 according to the first embodiment are obtained.

In addition, in the modification, as the light sources for position detection, the visible light sources 28 emitting visible light are used, but the light sources for position detection are not limited thereto, and light sources emitting near-infrared light may be used.

Application Example 1

Figure 10:
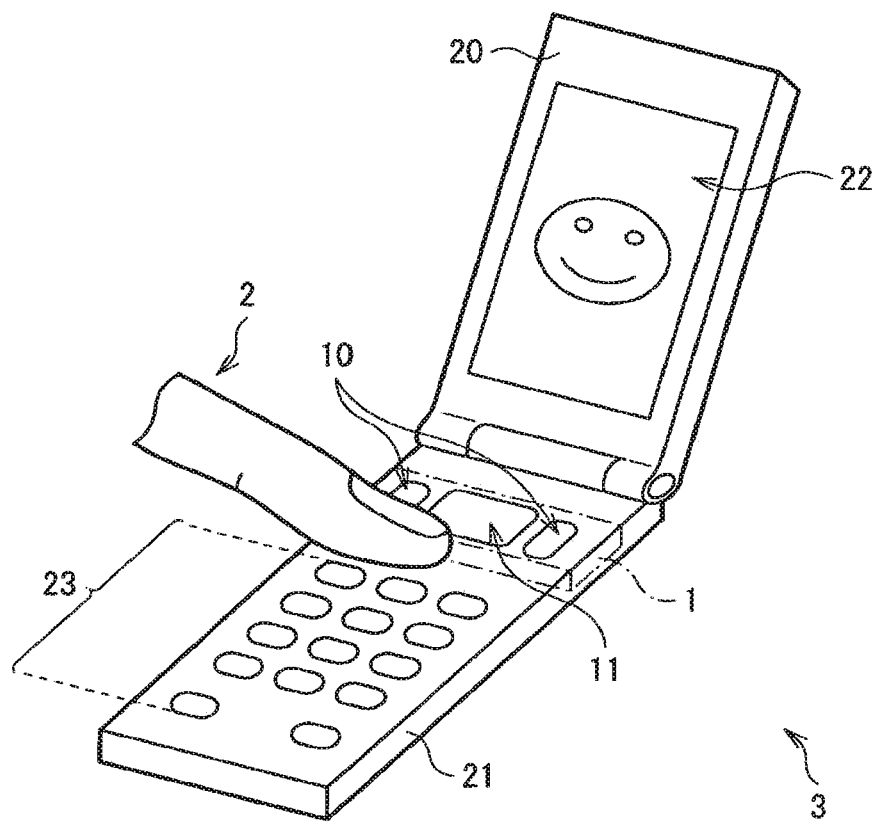
FIG. 10 is a perspective view of the schematic configuration of a cellular phone according to Application Example 1.

FIG. 10 illustrates a schematic configuration of a cellular phone 3 according to Application Example 1 of the first embodiment. The cellular phone 3 includes a flip-type enclosure (a first enclosure 20 and a second enclosure 21), axed a display panel 22 for displaying an image is arranged in the first enclosure 20. On the other hand, in the second enclosure 21, an operation section 23 for performing input operation and the above-described biometrics authentication system 1 are arranged. However, the biometrics authentication system 1 is mounted in the cellular phone 3 so that the top surface (the cover glass 11) thereof is exposed to a surface of the second enclosure 21.

In the application example, as the biometrics authentication system 1 is mounted in the cellular phone 3, the biometrics authentication system 1 functions as, for example, a touch pad from which the input operation is performed in response to the position (including movement) of a fingertip of a user. More specifically, when contact by the fingertip (z=0) is detected, input by click operation is allowed. Moreover, when the frequency of occurrences of contact by the fingertip in a certain period is measured, input by double-click operation is allowed. Further, when the movement of the fingertip, that is, a change in the position (x, y) is detected, the biometrics authentication system 1 may function as a mouse pointer.

Moreover, function input for executing log-in, password substitution, settlement or the like may be performed. In other words, the biometrics authentication system 1 allows finger identification to be performed, so when a program for executing the above-described specific process in response to, for example, the order of fingers to be detected is set in advance, the function input is allowed. For example, a program for executing a process such as "open address book" when the right index finger and the right middle finger of a user is detected in this order may be set.

In addition, an apparatus to which the biometrics authentication system 1 is applied is not limited to the above-described cellular phone, and the biometrics authentication system 1 is applicable to, for example, various mobile devices such as a notebook type PC (Personal Computer).

Second Embodiment

Figure 11:
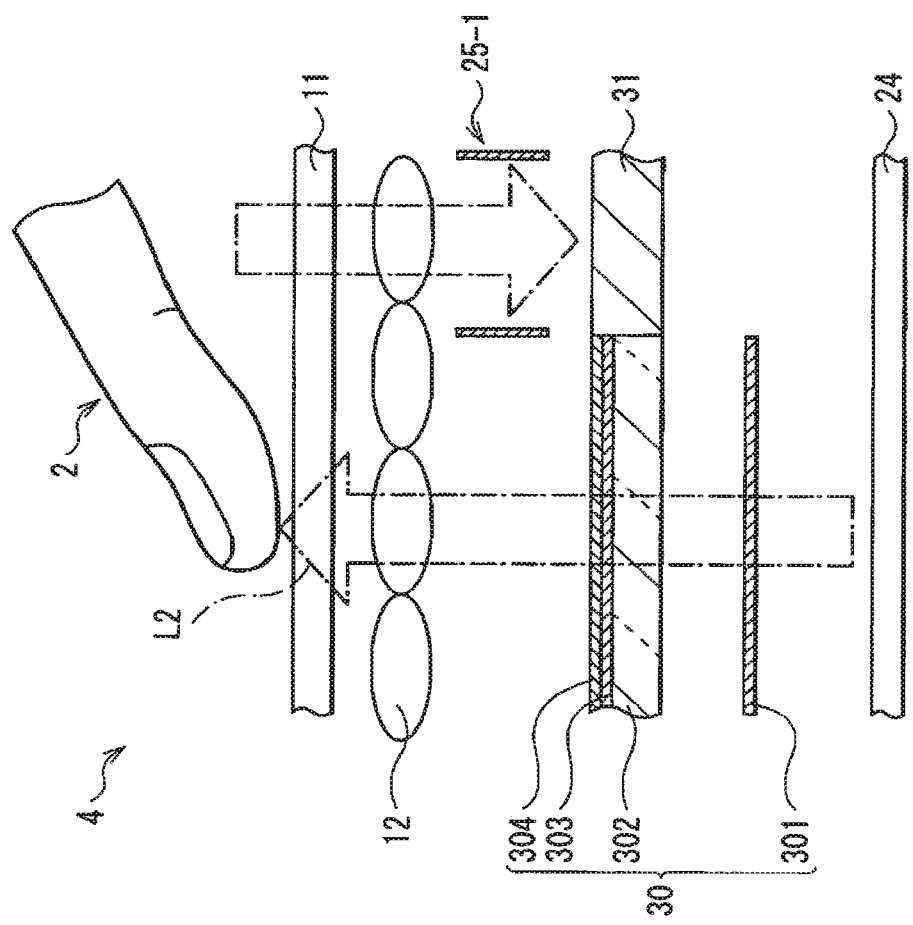
FIG. 11 is a schematic sectional view of the configuration of a main part of a biometrics authentication system according to a second embodiment of the invention.

FIG. 11 is a schematic sectional view of the configuration of a main part of a biometrics authentication system (a biometrics authentication system 4) according to a second embodiment of the invention. The biometrics authentication system 4 has an image display function in addition to the biometrics authentication function and the position detection function in the above-described biometrics authentication system 1. Therefore, like components are denoted by like numerals as of the biometrics authentication systems in the first embodiment and the above-described modifications and will not be further described.

In the biometrics authentication system 4, a display section 30 and a light-sensing section 31 are arranged in a common plane below the microlens array 12. The light-shielding section 25-1 far preventing the entry of stray light or the like into a light-sensing section 31 is arranged between the light-sensing section 31 and the microlens array 12. The light-sensing section 31 includes, for example, a plurality of light-sensing pixels arranged, and has the same function as that of the above-described light-sensing device 13. The backlight 24 is arranged below the light-sensing section 31 and the display section 30.

The display section 30 is a display device for displaying an image such as a graphic form, a character or the like, and is configured of an LCD (a liquid crystal display) in which a plurality of display pixels are arranged in a matrix form. The display section 30 includes a liquid crystal cell 302, a pair of polarizers 301 and 302 and a color filter 304. The display section 30 modulates light emitted from the backlight 24 to emit display light L2 toward above the cover glass 11. The display light L2 includes visible light and near-infrared light.

The liquid crystal cell 302 includes a pair of transparent substrates (not illustrated) and a liquid crystal layer (not illustrated) arranged between the pair of transparent substrates. The liquid crystal cell 302 modulates incident light from the backlight 24 in response to a voltage applied between the transparent substrates on the basis of image data.

The polarizer 301 is arranged in a region corresponding to the liquid crystal cell 302 between the backlight 24 and the liquid crystal cell 302. The polarizer 303 is arranged in a region corresponding to the liquid crystal cell 302 between the liquid crystal cell 302 and the microlens array 12.

The color filter 304 selectively allows light in a wavelength region corresponding to its own emission color (for example, red light, green light or blue light) and light in an invisible light region (for example, near-infrared light) of light from the backlight 24 having passed through the liquid crystal cell 302 and the polarizer 303 to pass therethrough.

Next, functions and effects of the above-described biometrics authentication system 4 will be described below.

In the biometrics authentication system 4, on the basis of light from the backlight 24, the display section 30 produces display light L2 (including the visible light and near-infrared light) for displaying an image to emit the display light L2 toward above the cover glass 11. At this time, for example, when the living body 2 such as a finger comes into contact with or comes close to the cover glass 11, the display light L2 is applied to the living body 2. The light applied to the living body 2 is condensed by the microlens array 12, and then is detected by the light-sensing section 31. Thereby, light detection data of the living body 2 is obtained. On the basis of the light detection data obtained in such a manner, as in the case of the first embodiment, the image processing section 14 produces image processing data (parallax image data Die and DR), and on the basis of the image processing data, in the authentication section 15 or the position detection section 16, biometrics authentication or position detection is performed. Therefore, all of biometrics authentication, position detection and image display are implemented.

Application Example 2

Figure 12:
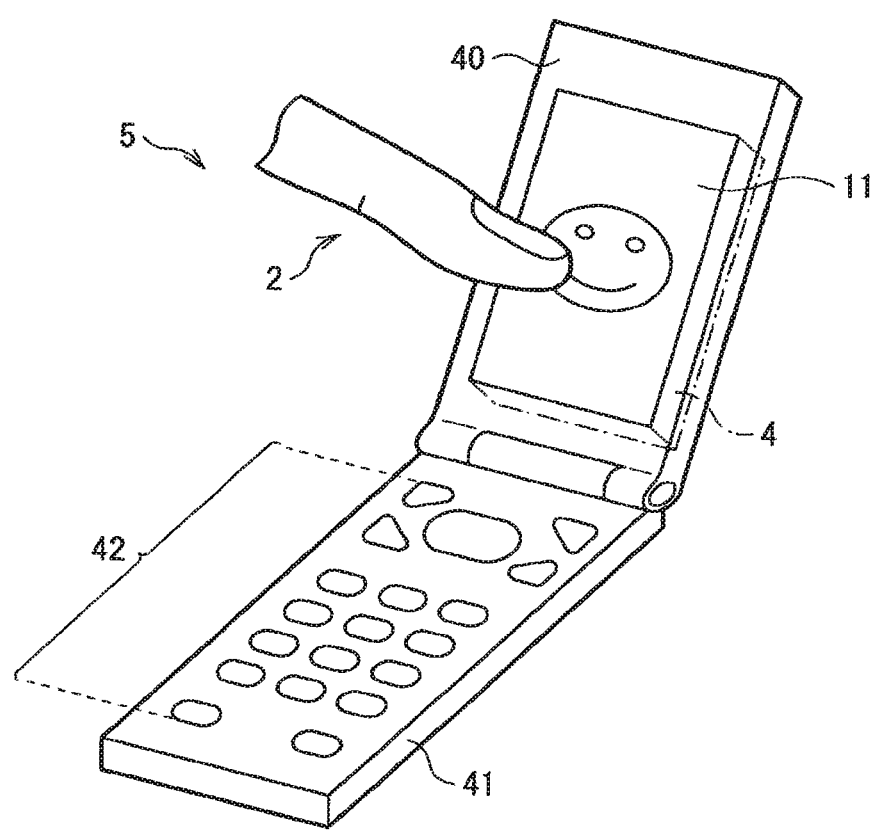
FIG. 12 is a perspective view of the schematic configuration of a cellular phone according to Application Example 2.

FIG. 12 illustrates the schematic configuration of a cellular phone 5 according to Application Example 2 of the second embodiment. The cellular phone 5 includes a flip-type enclosure (a first enclosure 40 and a second enclosure 41), and the above-described biometrics authentication system 4 is arranged in the first enclosure 40, and an operation section 42 for performing input operation is arranged in the second enclosure 41. However, the biometrics authentication system 4 is mounted in the cellular phone 5 so that the top surface (the cover glass 11) thereof is exposed to a surface of the first enclosure 40.

In the application example, as the biometrics authentication system 4 is mounted in the cellular phone 5, input operation is performed in response to the position of a fingertip of a user while displaying an image on the cover glass 11. In other words, the biometrics authentication system 4 also functions as a touch panel. For example, the same technique as that of the touch pad in Application Example 1 of the first embodiment is used to allow input by click operation, double-click operation, mouse pointer operation or the like associated with contents to be displayed, a position where an image is displayed, or the like.

Figure 13:
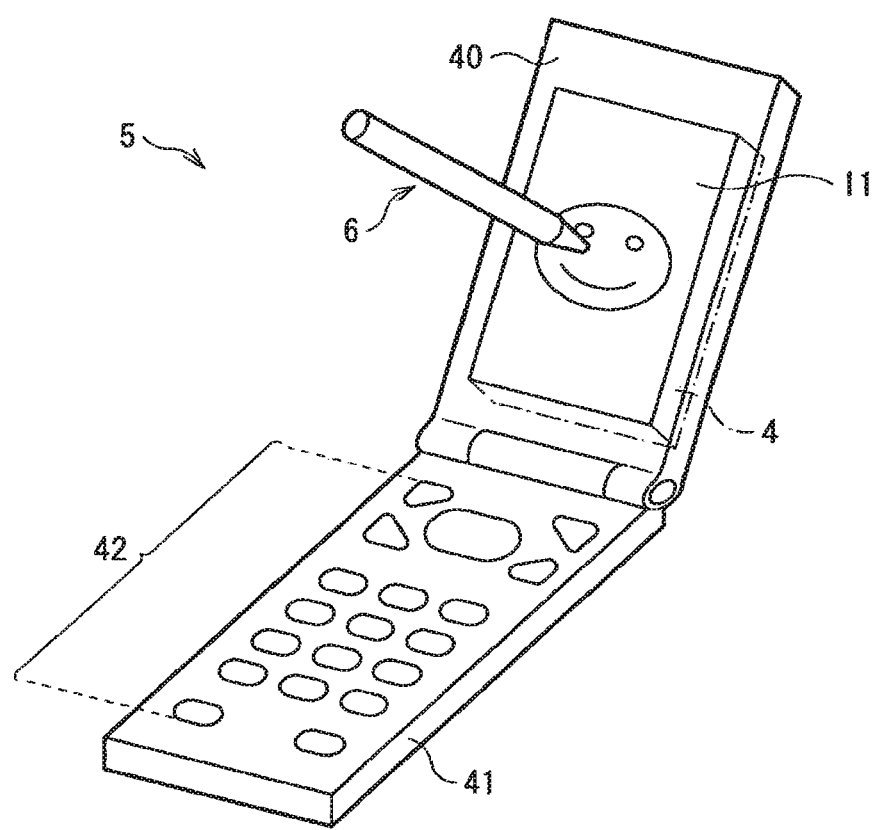
FIG. 13 is an illustration of another usage example of the cellular phone illustrated in FIG. 12.

An object of which the position is to be detected is not limited to the living body 2, and may be any other object, for example, a stylus 6 as illustrated in FIG. 13. Also in this case, right and left parallax image data are produced by image processing by the above-described image processing section 14, and a phase difference between the parallax image data is detected, thereby the position (x, y, z) of the stylus 6 is detected. Thereby, input using the stylus 6 is allowed.

Third Embodiment

Figure 14:
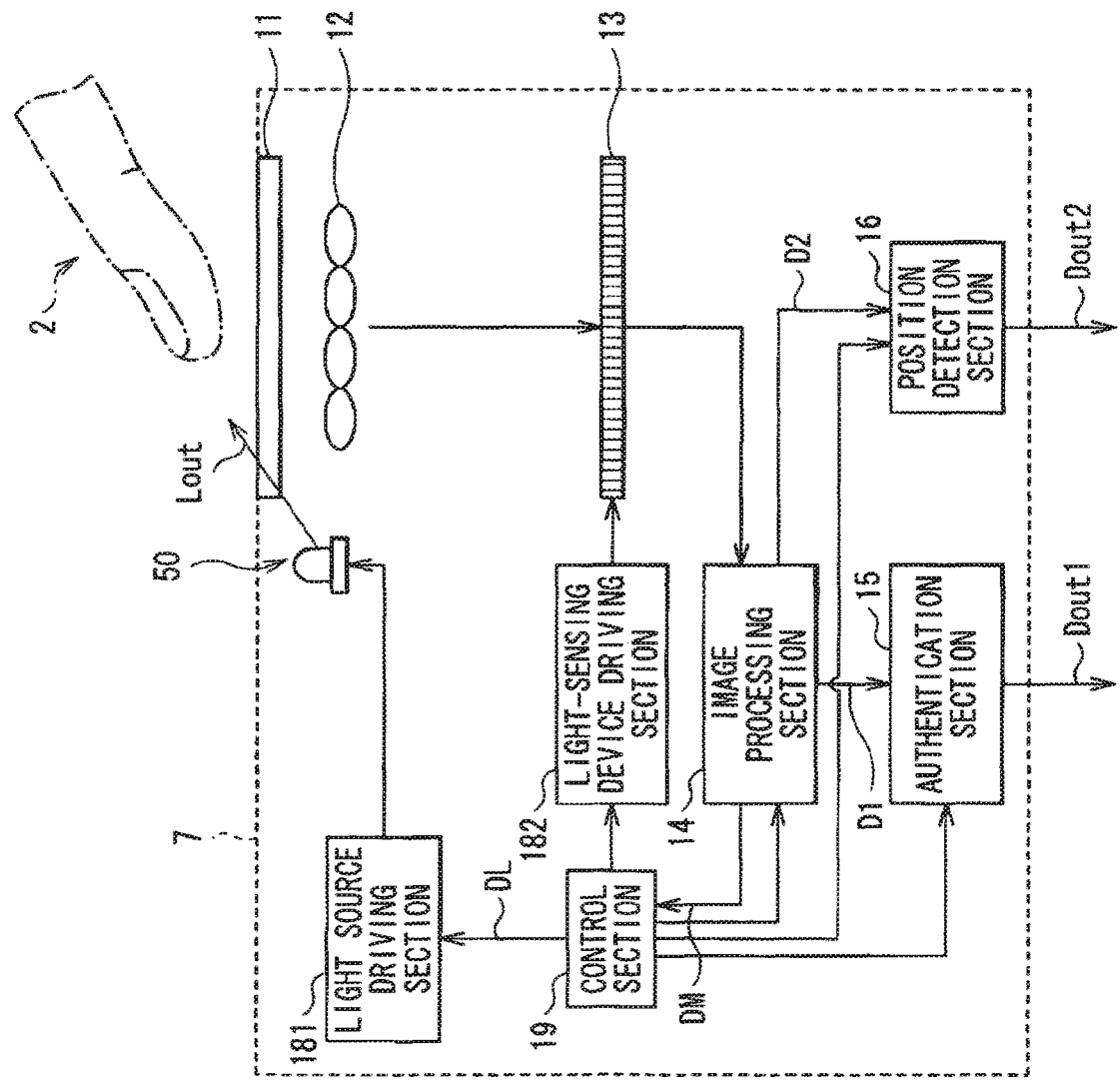
FIG. 14 is an illustration of the whole configuration of a biometrics authentication system according to a third embodiment of the invention.
Figure 15:
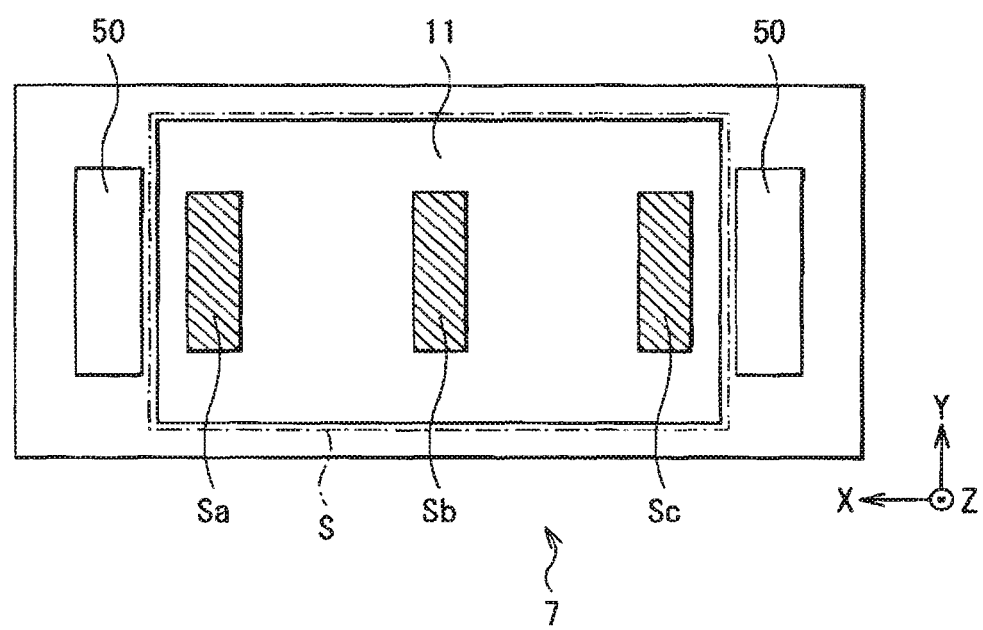
FIG. 15 is a schematic top view of the biometrics authentication system illustrated in FIG. 14.

FIG. 14 illustrates the whole configuration of a biometrics authentication system (a biometrics authentication system 7) according to a third embodiment of the invention. FIG. 15 is a schematic view of the biometrics authentication system 7 viewed from above. The biometrics authentication system 7 performs authentication of the living body 2 or position detection of the living body 2 as in the case of the biometrics authentication system 1 according to the first embodiment, and is applied to a touch pad. However, the biometrics authentication system 7 automatically (more specifically, depending on the placement of a finger) determines which one between an authentication function for authentication of the living body 2 and a position detection function of the living body 2 to be executed, and then switches between the functions.

As in the case of the biometrics authentication system 1 according to the first embodiment, the biometrics authentication system 7 includes the cover glass 11, the microlens array 12, the light-sensing device 13, the image processing section 14, the authentication section 15, the position detection section 16, the light source driving section 181, the light-sensing device driving section 182 and the control section 19. Light sources 50 for applying light to the living body 2 are arranged on both sides of the image pickup region S. Therefore, like components are denoted by like numerals as of the biometrics authentication system 1 according to the first embodiment and will not be further described.

The light sources 50 each include, for example, a plurality of LEDs arranged, and may be near-infrared light sources or visible light sources emitting white light or the like. In the case where biometrics authentication is performed through the use of veins, near-infrared light sources are preferably used, and in the case where biometrics authentication is performed through the use of fingerprints, visible light sources are preferably used.

As in the case of the first embodiment, the light source driving section 181 drives the light sources 50 to emit light. However, in the embodiment, the light source driving section 181 drives the light sources 50 in response to the control (a control signal $D_L$) of the control section 19 so that the light emission amounts (light source outputs) of the light sources 50 are changeable. More specifically, the light source driving section 181 performs switching between a light source output (a light amount a1) for position detection and a light source output (a light amount a2) for authentication depending on a function to be executed. The light amount a1 for position detection is a necessary and sufficient light amount for detecting the position of the living body 2, and the light amount a2 for authentication is a light amount by which a vein pattern of the living body 2 is obtainable. In this case, in position detection, it is only necessary to apply light to the surface of the living body 2 to highlight the outside shape of the living body 2 to an extent distinguishable from other regions, so the light amount a1 is relatively small. On the other hand, in authentication, it is necessary to irradiate the inside of the living body 2 with light to capture the shapes of veins, so the light amount a2 is relatively large (a1<a2).

As described in the first embodiment, the light-sensing device driving section 182 drives the light-sensing device 13 to pick up an image (to detect light). However, in the embodiment, the light-sensing device driving section 182 drives the light-sensing device 13 to selectively retrieve pixel data in a specific region, for example, regions Sa, Sb and Sc in the light-sensing device 13 (in the image pickup region S).

The regions Sa, Sb and Sc are arranged in both end parts and a central part in a longitudinal direction of the rectangular image pickup region S. The number of the specific regions, and the areas, positions and the like of the specific regions are not specifically limited, but as in the case of the regions Sa, Sb and Sc, a plurality of specific regions are preferably arranged along a longitudinal direction in the image pickup region S, because as will be described later, which one between the position detection function and the authentication function to be executed is determined depending on the placement of a finger in the image pickup region S.

As described in the first embodiment, the image processing section 14 performs predetermined image processing on light detection data. However, in the embodiment, the image processing section 14 performs predetermined arithmetic processing on the basis of each of the pixel data of the region Sa, Sb and Sc in the image pickup region S, and determines which one between the position detection function and the authentication function to be executed on the basis of an arithmetic result obtained by the arithmetic processing. A function determination result (determination result data $D_M$) by the image processing section 14 is outputted to the control section 19. In this case, the image processing section 14 includes "a function determination section" in the invention.

As described in the first embodiment, the control section 19 controls the operations of the image processing section 14, the authentication section 15, the light source driving section 181 and the light-sensing device driving section 182 as appropriate. However, in the embodiment, the control section 19 selectively controls the authentication section 15 or the position detection section 16 on the basis of the determination result data $D_M$ inputted from the image processing section 14, and controls the light source driving section 181 so as to change the outputs of the light sources 50.

Next, functions and effects of the embodiment will be described below referring to FIGS. 14 to 17.

In the embodiment, as in the case of the first embodiment, light applied to the living body 2 is condensed by the microlens array 12, and then is detected in the light-sensing device 13. Thereby, the light detection data of the living body 2 is obtained in the light-sensing device 13, and the obtained light detection data is outputted to the image processing section 14. The image processing section 14 performs the above-described image processing on the light detection data to produce image processing data, and the image processing data is outputted to the authentication section 15 or the position detection section 16. Thereby, the authentication section 15 performs authentication of the living body 2, and the position detection section 16 performs position detection of the living body 2.

However, in the embodiment, the image processing section 14 determines which one between the authentication function or the position detection function to be executed, before producing the above-described image processing data. Then, on the basis of the determination result, the control section 19 executes the authentication function or the position detection function, and on the basis of the function to be executed, the light source driving section 181 drives the light sources 50 so as to change their output. Such a function determination process and such a light source output changing process will be described below.

Figure 16A:
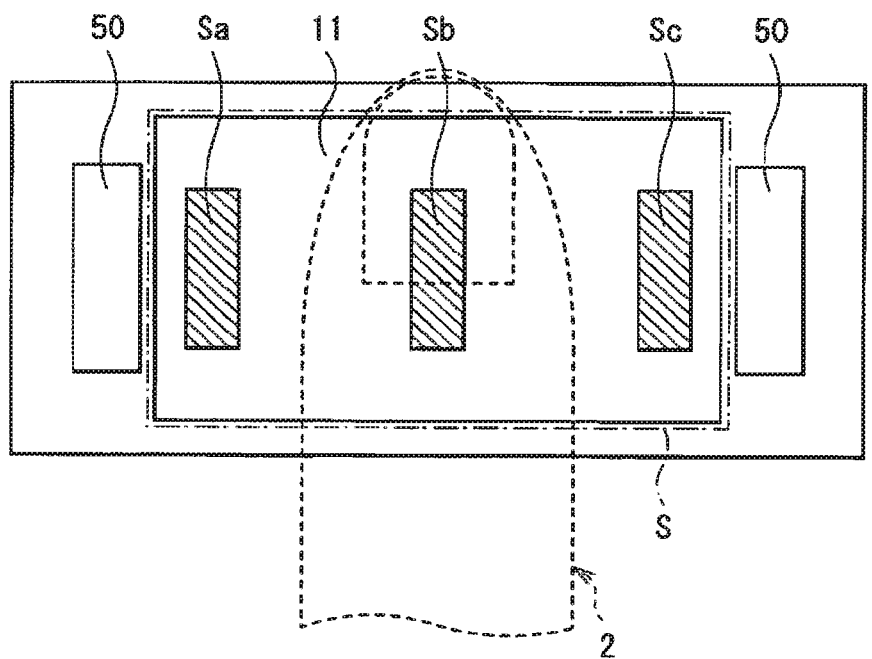
FIGS. 16A and 16B are illustrations of the placement of a finger corresponding to position detection and authentication in the biometrics authentication system illustrated in FIG. 14.
Figure 16B:
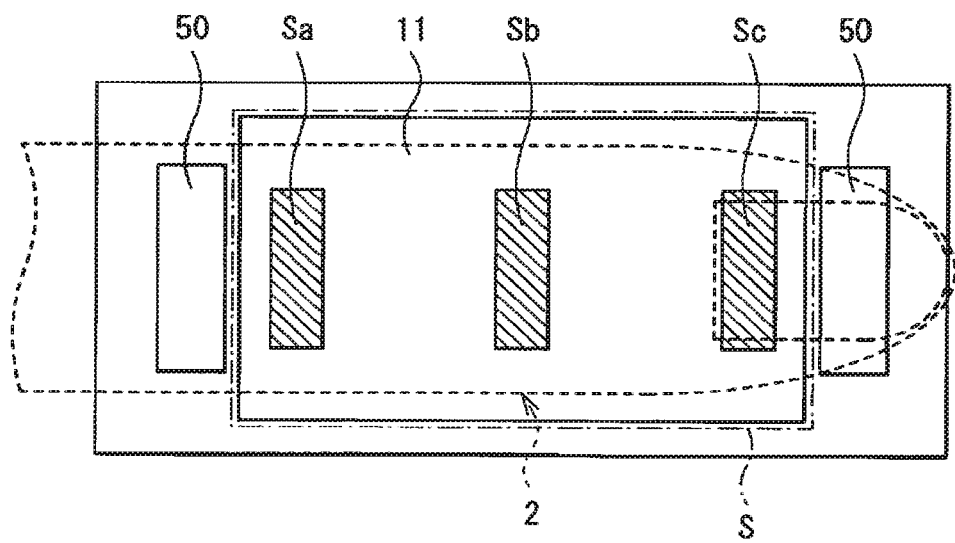

FIG. 16A schematically illustrates the placement of the living body 2 when executing the position detection function, and FIG. 16B schematically illustrates the placement of the living body 2 when executing the authentication function. When the living body 2 is placed so that the longitudinal direction of the rectangular image pickup region S and the longitudinal direction of the living body 2 (a finger) intersect with each other, the image processing section 14 determines to execute the position detection function. On the other hand, when the longitudinal direction of the living body 2 (the finger) is placed along the longitudinal direction of the rectangular image pickup region S, the image processing section 14 determines to execute the authentication function.

Figure 17:
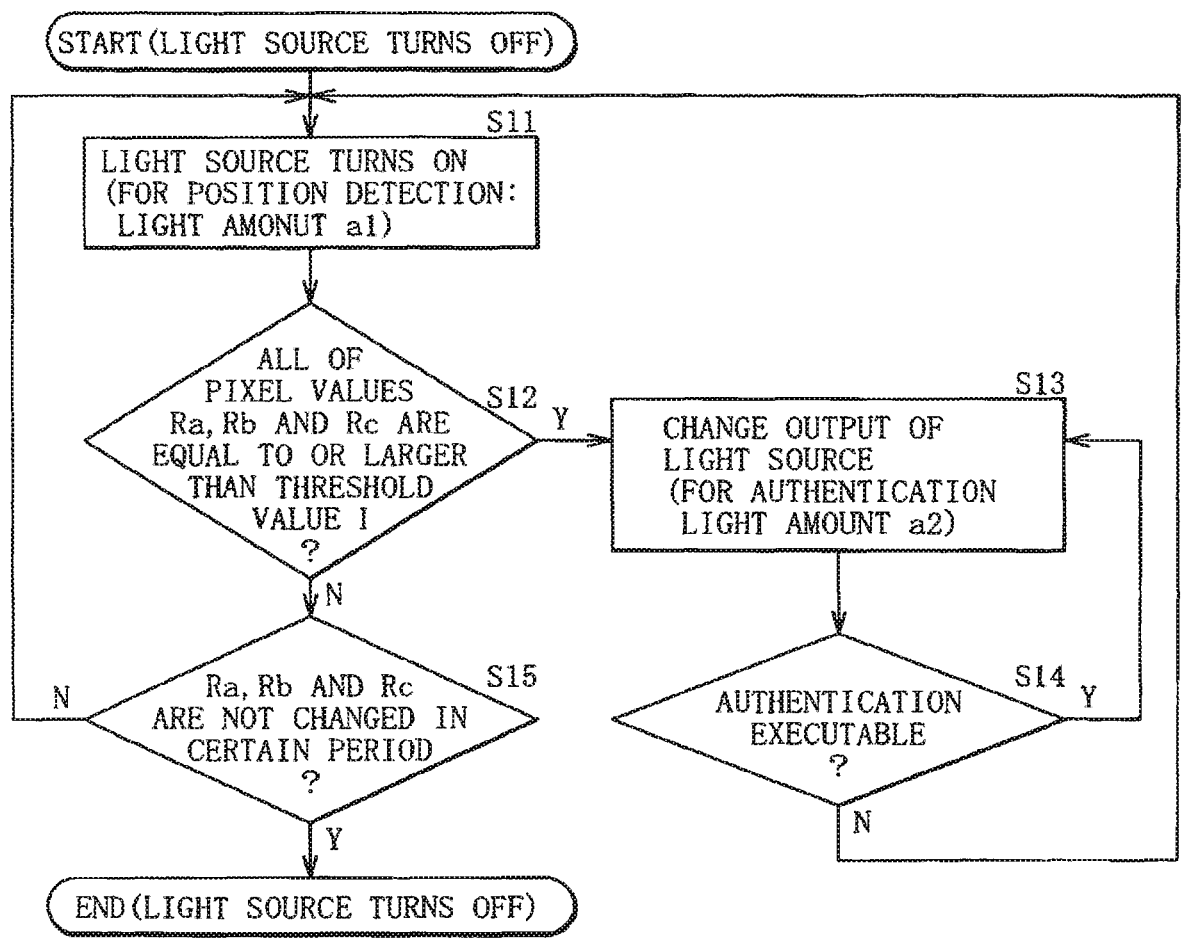
FIG. 17 is a flowchart of a function determination process and a light source output changing process in the biometrics authentication system illustrated in FIG. 14.

More specifically, as will be described below, function determination is performed, and the light source outputs are changed. That is, as illustrated in FIG. 17, first, the light source driving section 181 turns the light sources 50 on (step S11). At this time, the light emission amount of the light sources 50 is the light amount a1 for position detection of the living body 2. When the light sources 50 illuminate, the light-sensing device 13 obtains pixel data in the specific regions Sa, Sb and Sc in the image pickup region S in response to the drive control of the light-sensing device driving section 182. Each of the obtained pixel data is outputted to the image processing section 14.

The image processing section 14 calculates the average value (a pixel value Ra, Rb or Rc) of the pixel data in each of the regions Sa, Sb and Sc, and compares the average values to a predetermined threshold value I (step S12). As a result, in the case where all of the pixel values Ra, Rb and Rc are equal to or larger than the threshold value I (step S12: Y), the living body 2 is considered to be placed as illustrated in FIG. 16B, thereby the image processing section 14 determines to execute the authentication function. On the other hand, in the case where one or more of the pixel values Ra, Rb and Rc are smaller than the threshold value I (step S12: N), the living body 2 is considered to be placed as illustrated in FIG. 16A, the image processing section 14 determines to execute the position detection function. These determination results are outputted to the control section 19 as the determination result data $D_M$.

In the case where the image processing section 14 determines to execute the authentication function, the light source driving section 181 drives the light sources 50 in response to the control of the control section 19 to change the outputs of the light sources 50 from the light amount a1 for position detection to the light amount a2 for authentication (step S13). Moreover, the light-sensing device driving section 182 drives the light-sensing device 13 to obtain the light detection data. The image processing section 14 performs the above-described image processing on the light detection data on the basis of the light amount a2 to produce image processing data D1 on the basis of the light amount a2, and then outputs the image processing data D1 to the authentication section 15. The authentication section 15 compares the inputted image processing data D1 to the predetermined authentication pattern. At this time, the authentication section 15 determines whether or not authentication is executable on the basis of the image processing data D1 (step S14), and the outputs of the light sources 50 are maintained at the light amount a2 until authentication is properly completed (step S14: Y). In the case where authentication is properly completed (step S14: N), authentication operation in the authentication section 15 is terminated, and then the procedure in the biometrics authentication system 7 goes back to the step S11. The authentication result is outputted to outside as authentication result Dout1.

In the case where the image processing section 14 determines to execute the position detection function, light detection data is obtained while maintaining the outputs (the light amount a1) of the light sources 50. The image processing section 14 performs the above-described image processing on the light detection data on the basis of the light amount a1 to produce image processing data D2 on the basis of the light amount a1, and then outputs the image processing data D2 to the position detection section 16. The position detection section 16 detects the position (x, y, z) of the living body 2 by the same technique as that in the first embodiment on the basis of the inputted image processing data D2. Next, the pixel values Ra, Rb and Rc in the regions Sa, Sb and Sc are calculated to determine whether or not the pixel values Ra, Rb and Rc are changed in a certain period (step S15), and when the pixel values Ra, Rb and Rc are changed (step S15: N), the procedure goes back to the step S11. In the case where the pixel values Ra, Rb and Rc are not changed (step S15: Y), the light source driving section 181 turns the light sources 50 off to complete the position detection process. Information on the position (x, y, z) is outputted to outside as position data Dout2.

As described in the embodiment, the light detection data is obtained on the basis of light applied from the light sources 50 to the living body 2, and the image processing section 14 performs the predetermined image processing on the light detection data to produce image processing data D1 and D2, The produced image processing data D1 and D2 are outputted to the authentication section 15 and the position detection section 16, thereby the authentication section 15 performs authentication of the living body 2, and the position detection section 16 detects the position of the living body 2. Therefore, the same effects as those in the first embodiment are obtained.

Moreover, in the embodiment, the specific regions Sa, Sb and Sc are arranged in the image pickup region S, thereby the image processing section 14 determines which direction the living body 2 is placed on the basis of the pixel values Ra, Rb and Rc of the regions Sa, Sb and Sc. In this case, the direction where the living body 2 is placed in position detection is different from that in authentication, thereby which one between the position detection function and the authentication function to be executed is determined by a change in the direction where the living body 2 is placed. Moreover, the outputs of the light sources 50 are changed (set) to an optimum output for position detection or for authentication by a change in the direction where the living body 2 is placed. Necessary light amounts for position detection and authentication are different from each other, so when the outputs of the light sources 50 are changed depending on a function to be executed, the amount of wasted light is eliminated to achieve power savings. Therefore, the biometrics authentication system 7 is specifically suitable as a module mounted in an apparatus strongly demanding power savings such as a cellular phone or low-profile notebook computer.

Modification 4

Figure 18:
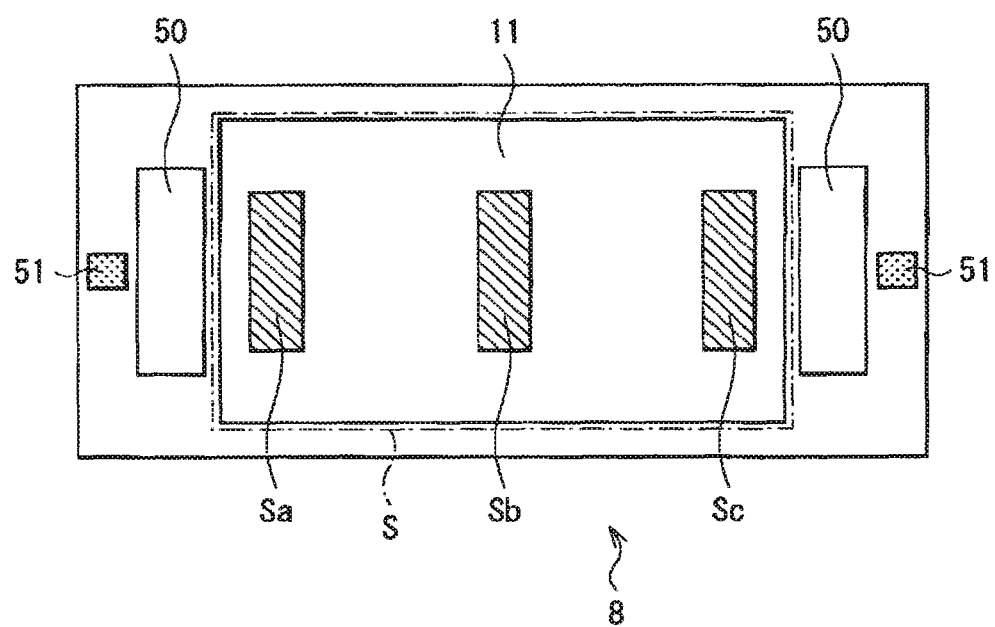
FIG. 18 is a schematic top view of a biometrics authentication system according to Modification 4.

FIG. 18 is a schematic view of a biometrics authentication system (a biometrics authentication system 8) according to a modification (Modification 4) of the third embodiment viewed from above (from the cover glass 11 side). The biometrics authentication system 8 includes light sources 50 on both sides of the cover glass 11, and photosensors 51 are arranged outside the light sources 50 (farther from the image pickup region S than the light sources 50). As the photosensor 51, for example, a single light-sensing device, a photoreflector detecting approach of the living body 2 from a height direction by closely arranging a light-emitting device and a light-sensing device, or the like is used. As in the case of the third embodiment, the biometrics authentication system 8 includes the microlens array 12, the light-sensing device 13, the image processing section 14, the authentication section 15, the position detection section 16, the light source driving section 181, the light-sensing device driving section 182 and the control section 19 (all not illustrated). Therefore, like components are denoted by like numerals as of the third embodiment and will not be further described.

Figure 19A:
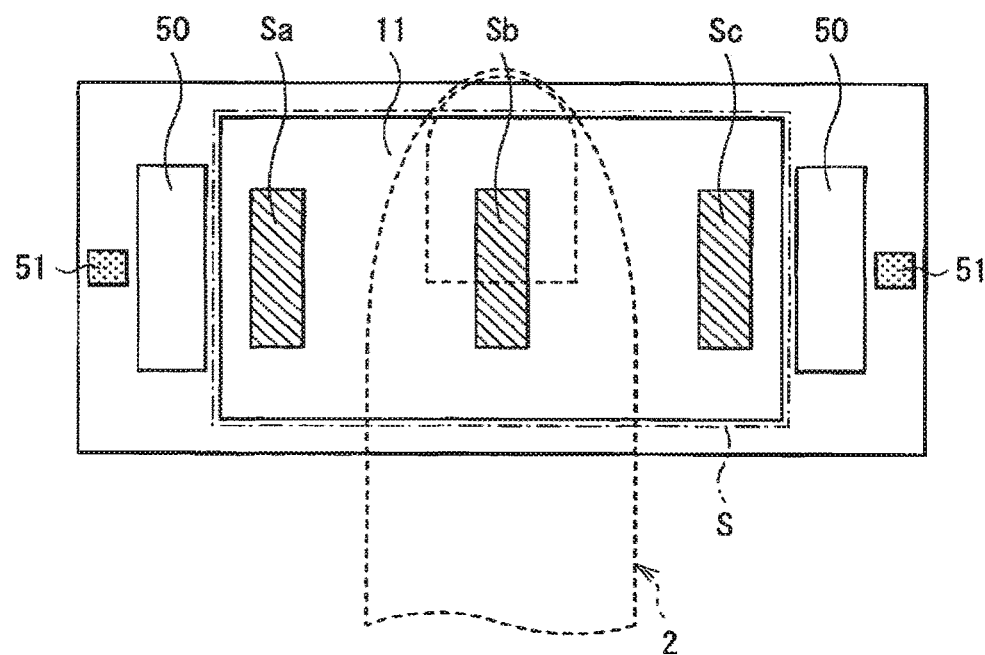
FIGS. 19A and 19B are illustrations of the placement of a finger corresponding to position detection and authentication in the biometrics authentication system illustrated in FIG. 18.
Figure 19B:
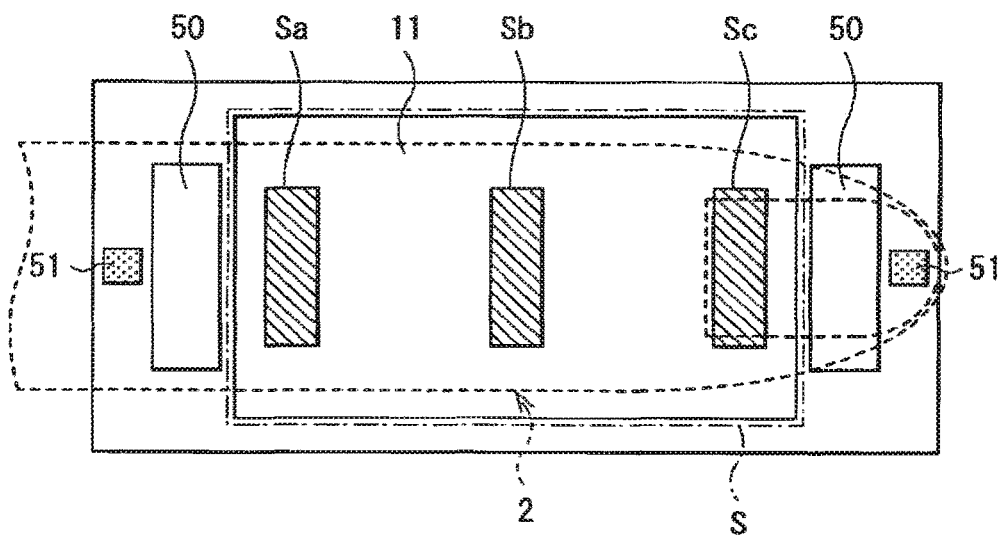

As in the case of the third embodiment, in the modification, the specific regions Sa, Sb and Sc are arranged in the image pickup region S. Moreover, the light-sensing device driving section 182 drives the light-sensing device 13 to selectively obtain pixel data in the regions Sa, Sb and Sc, and the image processing section 14 determines a function to be executed. Further, in the case where the living body 2 is placed as illustrated in FIG. 19A, the image processing section 14 determines to execute the position detection function, and in the case where the living body 2 is placed as illustrated in FIG. 19B, the image processing section 14 determines to execute the authentication function.

Figure 20:
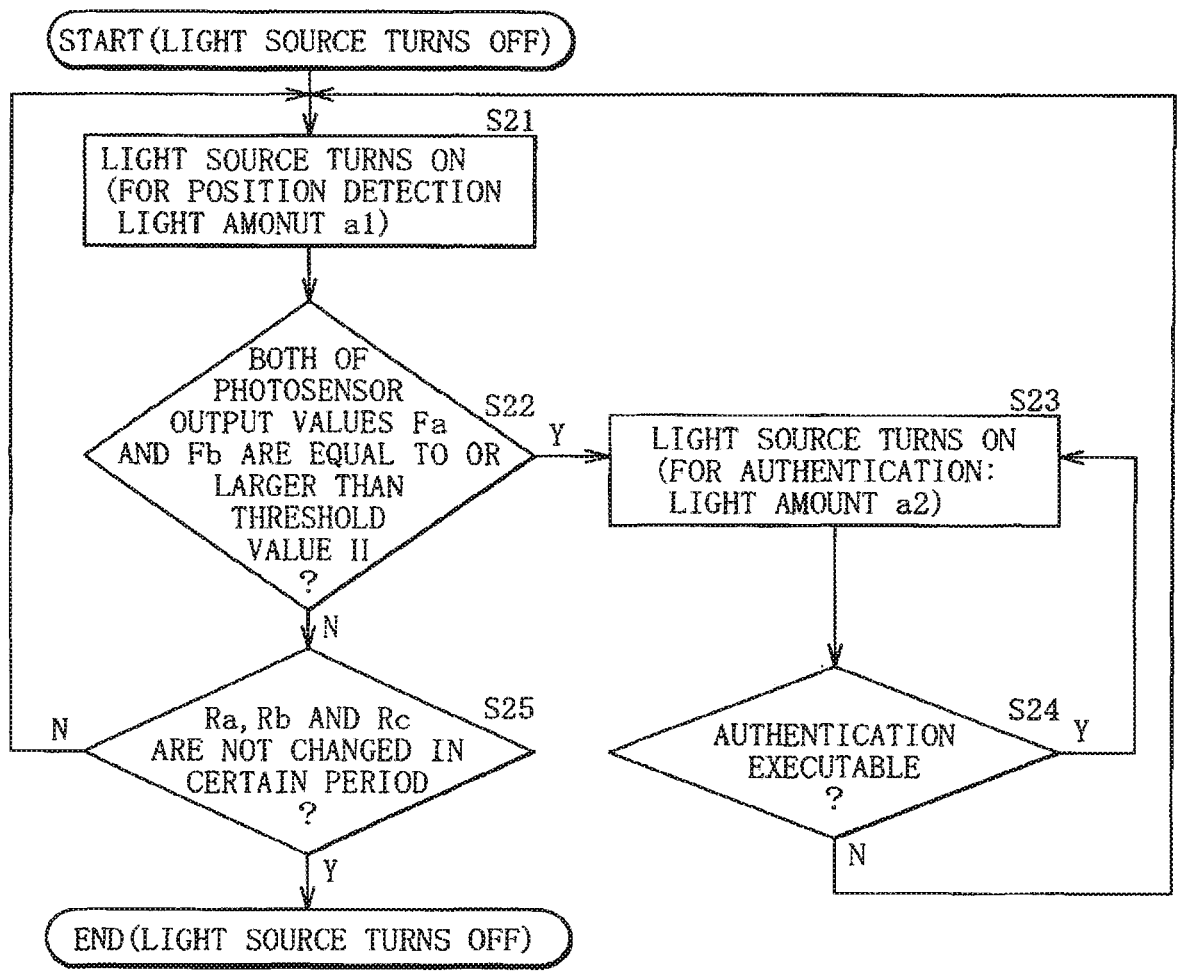
FIG. 20 is a flowchart of a function determination process and a light source output changing process in the biometrics authentication system illustrated in FIG. 18.

However, the modification is distinguished from the third embodiment by the fact that when determining a function to be executed, outputs from the photosensors 51 are used instead of the pixel values Ra, Rb and Rc in the regions Sa, Sb and Sc. More specifically, in the modification, as will be described below, function determination is performed, and the light source outputs are changed. That is, as illustrated in FIG. 20, first, the light source driving section 181 turns the light sources 50 on (step S21). At this time, the light emission amount of the light sources 50 is set to the light amount a1 for position detection. Output values Fa and Fb of the photosensors 51 on the basis of the light amount a1 are compared to a predetermined threshold value 11 (step S22). As a result, in the case where both of the output values Fa and Fb are equal to or larger than the threshold value II (step S22: Y), the living body 2 is considered to be placed as illustrated in FIG. 19B, and the image processing section 14 determines to execute the authentication function. On the other hand, in the case where one or both of the output values Fa and Fb are smaller than the threshold value II (step S22: N), the living body 2 is considered to be placed, for example, as illustrated in FIG. 19B, and the image processing section 14 determines to execute the position detection function. The determination results are outputted to the control section 19 as the determination result data $D_M$.

In the case where the image processing section 14 determines to execute the authentication function, as in the case of the third embodiment, the outputs of the light sources 50 are changed from the light amount a1 for position detection to the light amount a2 for authentication (step S23). Moreover, the image processing section 14 produces the image processing data D1 on the basis of the light amount a2, and outputs the image processing data Dl to the authentication section 15. The authentication section 15 determines whether or not authentication is executable on the basis of the image processing data D1 (step S24), and the outputs of the light sources 50 are maintained at the light amount a2 until authentication is properly completed (step S24: Y). In the case where authentication is properly completed (step S24: N), authentication operation in the authentication section 15 is terminated, and then the procedure in the biometrics authentications system 8 goes back to the step S21. The authentication result is outputted to outside as authentication result Dout1.

In the case where the image processing section 14 determines to execute the position detection function, as in the case of the third embodiment, the light detection data is obtained while maintaining the outputs (the light amount a1) of the light sources 50. The image processing section 14 produces the image processing data D2 on the basis of the light amount a1, and outputs the image processing data D2 to the position detection section 16. The position detection section 16 detects the position (x, y, z) of the living body 2 on the basis of the image processing data D2. Next, the pixel values Ra, Rb and Rc in the regions Sa, Sb and Sc are calculated to determine whether or not the pixel values Ra, Rb and Rc are changed in a certain period (step S25). In the case where they are changed (step S25: N), the procedure goes back to the step S21. In the case where the pixel values Ra, Rb and Rc are not changed (step S25: Y), the light source driving section 181 turns the light sources 50 off to complete the position detection process. Information on the position (x, y, z) is outputted to outside as the position data Dout2.

As described above, in Modification 4, the photosensors 51 are separately arranged outside the image pickup region S, thereby which direction where the living body 2 is placed is determined on the basis of the output values Fa and Fb from the photosensors 51. Therefore, as in the case of the third embodiment, which one between the position detection function and the authentication function to be executed is determined. Moreover, the outputs of the light sources 50 are changed (set) to an optimum output for each function so as to execute the function, so power savings are achieved. Therefore, the same effects as those in the third embodiment are obtained. Moreover, when such sensors specifically for function determination are arranged in such a manner, determination is performed more accurately.

In addition, in Modification 4, the configuration in which two photosensors 51 are arranged outside the light sources 50 is described as an example. However, one or more photosensors may be arranged on only one side. Moreover, in function determination, in addition to the output values from the photosensors 51, the pixel values Ra, Rb and Rc may be used.

Modification 5

Figure 21:
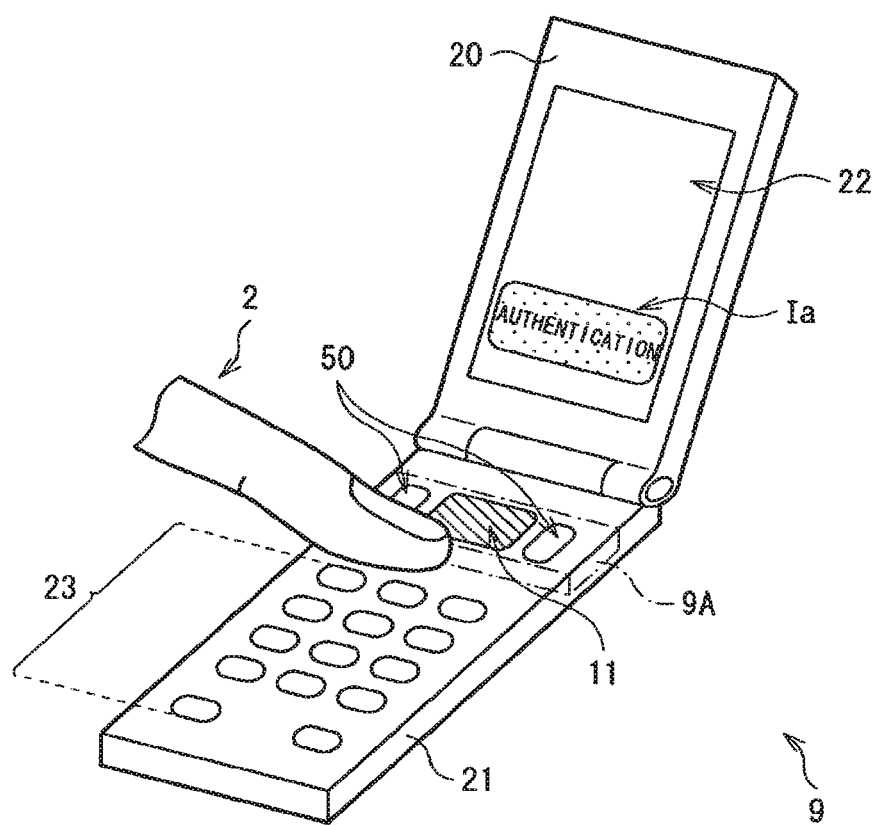
FIG. 21 is an illustration of the schematic configuration of a cellular phone according to Modification 5.

FIG. 21 illustrates a schematic configuration of a cellular phone 9 including a biometrics authentication system (a biometrics authentication system 9A) according to a modification (Modification 5) of the third embodiment. As in the case of the cellular phone 3 according to Application Example 1, the cellular phone 9 includes a flip-type enclosure (the first enclosure 20 and the second enclosure 21), and the display panel 22 for displaying an image is arranged in the first enclosure 20. The second enclosure 21 includes the operation section 23 and the biometrics authentication system 9A. The biometrics authentication system 9A is mounted in the cellular phone 9 so that the top surface (the cover glass 11) thereof is exposed to a surface of the second enclosure 21, and functions as a touch pad.

The biometrics authentication system 9A includes the light sources 50 on both sides of the cover glass 11, and as in the case of the third embodiment, the biometrics authentication system 9A includes the microlens array 12, the light-sensing device 13, the image processing section 14, the authentication section 15, the position detection section 16, the light source driving section 181, the light-sensing device driving section 182 and the control section 19 (all not illustrated). Therefore, like components are denoted by like numerals as of the third embodiment and will not be further described.

Also in the modification, as in the case of the third embodiment, the specific regions Sa, Sb and Sc are arranged in the image pickup region S. Moreover, the light-sensing device driving section 182 drives the light-sensing device 13 to selectively obtain pixel data in the regions Sa, Sb and Sc.

Figure 22:
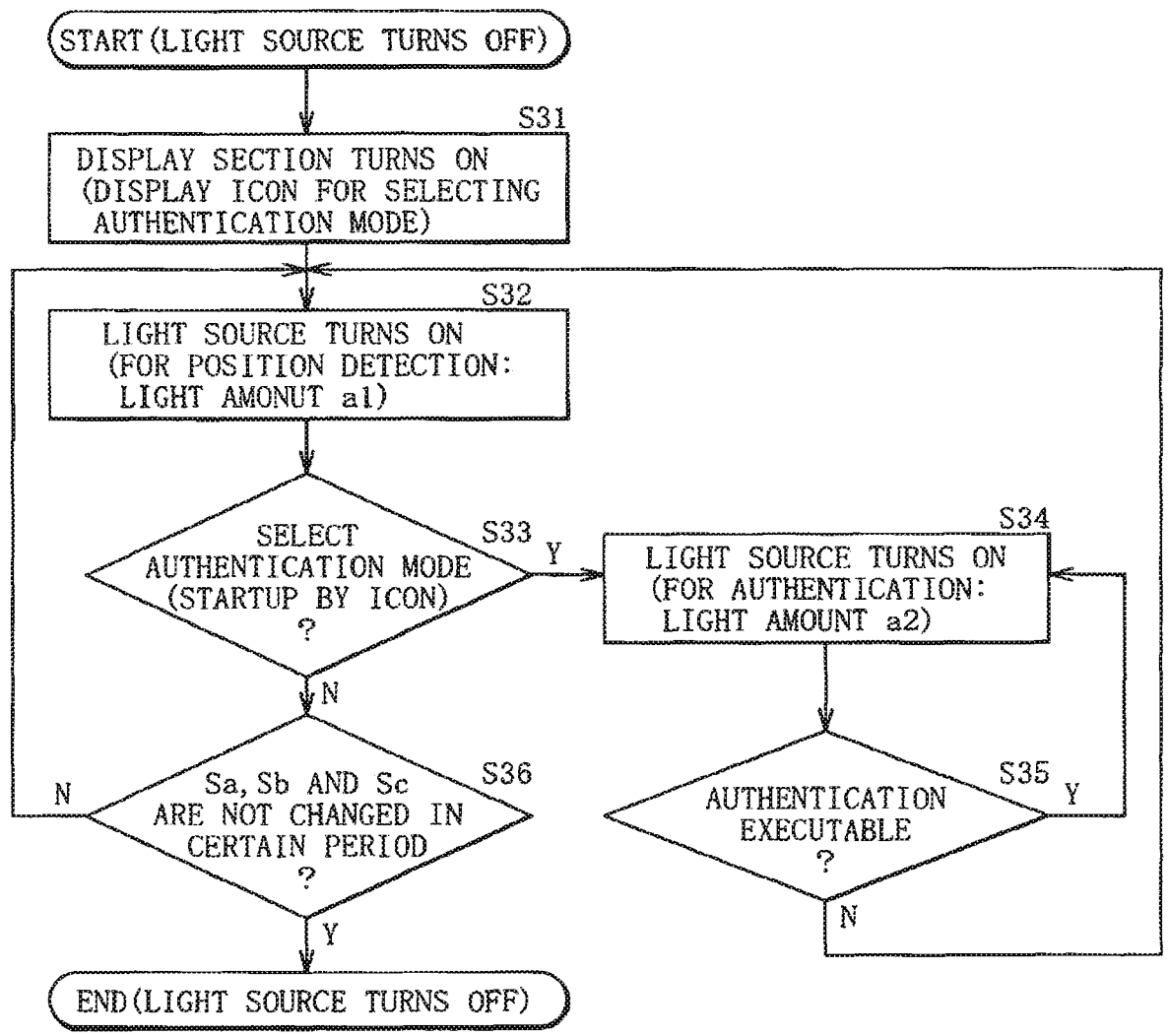
FIG. 22 is a flowchart of a function switching process and a light source output changing process in the cellular phone illustrated in FIG. 21.

However, the modification is distinguished from the third embodiment by the fact that a function to be executed is not determined by the placement of the living body 2, but the function to be executed is arbitrarily set by a command from outside, for example, a selection signal from a user. The light source driving section 181 changes the outputs of the light sources 50 depending on a function selected by the user. More specifically, as will be described below, a function to be executed is selected, and the light source outputs are changed. That is, as illustrated in FIG. 22, first, the display panel 22 turns to an ON state, and then an icon Ia for selecting the authentication function is displayed (step S31). Next, the light source driving section 181 turns the light sources 50 on (step S32). Under such a state, when the icon Ia is selected (touched) by the user (step S33: Y), the authentication function is executed. When the icon Ia is not selected (touched) by the user (step S33: N), the position detection function is executed.

In the case where the authentication function is executed, as in the case of the third embodiment, the outputs of the light sources 50 are changed from the light amount a1 for position detection to the light amount a2 for authentication (step S34). Moreover, the image processing section 14 produces the image processing data D1 on the basis of the light amount a2, and outputs the image processing data D1 to the authentication section 15. The authentication section 15 determines whether or not authentication is executable on the basis of the image processing data D1 (step S35), and the outputs of the light sources 50 are maintained at the light amount a2 until authentication is properly completed (step S35: Y). In the case where authentication is properly completed (step S35: N), the authentication operation in the authentication section 15 is terminated, and the procedure in the biometrics authentication system 9A goes back to the step S32. The authentication result is outputted to outside as the authentication result Dout1.

In the case where the position detection function is executed, as in the case of the third embodiment, the light detection data is obtained while maintaining the outputs (the light amount a1) of the light sources 50. The image processing section 14 produces the image processing data D2 on the basis of the light amount a1, and outputs the image processing data D2 to the position detection section 16. The position detection section 16 detects the position (x, y, z) of the living body 2 on the basis of the image processing data D2. Next, the pixel values Ra, Rb and Rc in the regions Sa, Sb and Sc are calculated to determine whether or not the pixel values Ra, Rb and Rc are changed in a certain period (step S36), and in the case where they are changed (step S36: N), the procedure goes back to the step S32. In the case where the pixel values Ra, Rb and Rc are not changed (step S36: Y), the light source driving section 181 turns the light sources 50 off to terminate the position detection process. Information on the position (x, y, z) is outputted to outside as the position data Dout2.

As described above, in Modification 5, for example, the icon Ia for selecting the authentication function is displayed on the display panel 22, and the user selects a function to be executed by the icon Ia. Moreover, the outputs of the light sources 50 are changed (set) to an optimum output for the selected function, so power savings are achieved. Therefore, the same effects as those in the third embodiment are obtained.

In addition, in Modification 5, as a means for selecting the authentication function, the icon displayed on the display panel 22 is described as an example. However, the selecting means is not limited to the icon, and may be a button or a switch separately arranged in the operation section 23 or the like.

Moreover, in the third embodiment and Modification 4, a function to be executed is determined on the basis of the direction where the living body 2 is placed. However, the invention is not limited thereto, and a function to be executed may be determined on the basis of the movement of the living body 2 on the image pickup region S. For example, when a finger is dragged on the image pickup region S in a longitudinal direction, the pixel values Ra, Rb and Rc are temporally changed. Therefore, determination that in the case where the finger moves as described above, the authentication function is executed may be performed by detecting a change in the pixel values Ra, Rb and Rc.

Moreover, in the third embodiment and Modifications 4 and 5, as an application example of the biometrics authentication system, the touch pad is described. However, the biometrics authentication system may be applied to a touch panel with the display function described in the second embodiment.

Although the present invention is described referring to the embodiments and the modifications, the invention is not limited thereto, and may be variously modified. For example, in the above-described embodiments and the like, in the image processing section 14, two right and left parallax image data are produced on the basis of the light detection data D0, but the number of produced parallax image data is not limited to two, and may be three or more. Moreover, the pixel data extracted from the light detection data D0 may be pixel data in any of the pixels in the light-sensing region 12D of each microlens. However, it is preferable to extract pixel data in pixels arranged in regions having as long base-line lengths from the left direction and the right direction as possible, because as described above, on the basis of the correlation between parallax images, a phase difference between the phases of the living body 2 in the parallax images is detected.

Moreover, in the above-described embodiments and the like, on the basis of the light detection data D0 obtained in the light-sensing device 13, the image processing section 14 produces the image processing data (parallax image data), and then inputs the image processing data to both of the authentication section 15 and the position detection section 16. However, the above-described parallax image data may be inputted to at least the position detection section 16. More specifically, the light detection data obtained in the light-sensing device 13 and not subjected to image processing by the image processing section 14 may be directly inputted to the authentication section 15, and authentication may be performed on the basis of the image pickup pattern of the light detection data. Alternatively, the image processing section 14 may perform only other image processing such as a noise reduction process on the light detection data obtained in the light-sensing device, and the processed light detection data may be inputted to perform authentication.

Further, in the above-described embodiments and the like, an IR pass filter selectively allowing near-infrared light to pass therethrough may be arranged on a light incident side of the light-sensing device, a light-sensing region or the light-sensing section. Thereby, the vein pattern of the picked-up image is obtained easily and accurately.

Moreover, light used for authentication is not necessarily near-infrared light as long as at least authentication of veins is allowed to be performed by applying the light to the inside of the living body 2. In addition, in vein authentication, an image of not only veins of a finger, but also veins of a palm or veins of fingers and palm may be picked up to be used for authentication.

In the above-described embodiments and the like, as an example of the display device, a liquid crystal device is described, However, any other display device, for example, a self-luminous device such as an organic or inorganic EL (Electro Luminescence) device may be used. However, in the case where the self-luminous device is used, the backlight may not be specifically arranged.

It should be understood by those skilled in the art that various modifications, combinations, sub-combinations and alterations may occur depending on design requirements and other factors insofar as they are within the scope of the appended claims or the equivalents thereof.

What is claimed is:

1. A biometrics authentication system, comprising:
a light source configured to emit light, wherein
the light impinges on an object and is reflected from the object, and
the object is a user's body part;
a microlens array configured to condense the light that passes through the microlens array;
a light-sensing device comprising a plurality of light sensing regions that includes a plurality of pixels, wherein the light-sensing device is configured to:
sense the condensed light incident on the plurality of pixels; and
generate light detection data of the object corresponding to the sensed light; and
a processor configured to:
generate multiple parallax image data of the object based on the light detection data of the object, wherein
the multiple parallax image data comprises data corresponding to a plurality of parallax images of the object,
the light detection data comprises multiple pixel data,
the multiple pixel data are associated with pixels at a relatively same pixel position, of a plurality of pixel positions, on different light sensing regions of the plurality of light sensing regions, and
the multiple parallax image data is generated based on synthesis of the multiple pixel data;
determine a phase difference between at least two parallax image data of the multiple parallax image data based on a correlation between the at least two parallax image data of the multiple parallax image data;
determine a three-dimensional position of the object based on the determined phase difference between the at least two parallax image data of the multiple parallax image data; and
execute authentication of the object based on the generated multiple parallax image data of the object.

2. The biometrics authentication system according to claim 1, wherein the processor is further configured to:
   execute an image processing operation on the light detection data generated by the light-sensing device, wherein
      the plurality of pixels of the light-sensing device is in the plurality of pixel positions on the plurality of light sensing regions,
      the plurality of light sensing regions is on a focal plane of the microlens array,
      a light sensing region of the plurality of light sensing regions comprises an area on a surface of the light-sensing device,
      the surface of the light-sensing device corresponds to a microlens of the microlens array, and
      for each light sensing region of the plurality of light sensing regions, the plurality of pixel positions is in a pattern of a plurality of patterns; and
   generate the multiple parallax image data based on the image processing operation on the light detection data.

3. The biometrics authentication system according to claim 1, wherein the light emitted by the light source has a wavelength approximately 700 nanometers (nm) to 1200 nm.

4. The biometrics authentication system according to claim 1, wherein
   the biometrics authentication system is mounted in an electronic device,
   the electronic device is configured to receive user-input information,
   operations of the electronic device are controlled based on the user-input information, and
   the biometrics authentication system functions as a touch pad input device for the electronic device such that the biometrics authentication system generates the user-input information based on the determined three-dimensional position of the object.

5. The biometrics authentication system according to claim 1, wherein the processor is further configured to:
   execute an image processing operation on the light detection data generated by the light-sensing device, wherein
      the plurality of pixels of the light-sensing device is on the plurality of light sensing regions,
      the plurality of light sensing regions is on a focal plane of the microlens array such that M≥2 light sensing regions $Ru_{[j]}$ are defined, where j is an index such that j={1, 2, . . . , M} and each of the index j specifies a different light sensing region of the M≥2 light sensing regions $Ru_{[j]}$,
      each of the M≥2 light sensing regions $R_{[j]}$ comprises an area on a surface of the light-sensing device,
      each of the M≥2 light sensing regions $R_{[j]}$ corresponds to a respective microlens of the microlens array,
      each pixel of the plurality of pixels is at one pixel position of the plurality of pixel positions,
      each of the M≥2 light sensing regions $R_{[j]}$ includes N≥2 pixel positions $P_{[j,k]}$ of the plurality of pixel positions, where k is an index such that k={1, 2, . . . , N},
      for each of the index j, each of the index k specifies a pixel position of the N≥2 pixel positions $P_{[j,k]}$ of each of the M≥2 light sensing regions $R_{[j]}$,
      for each of the M≥2 light sensing regions $R_{[j]}$, the N≥2 pixel positions $P_{[j,k]}$ of each of the M≥2 light sensing regions $R_{[j]}$ are in a pattern within a respective light sensing region of the M≥2 light sensing regions $R_{[j]}$,
      the respective pattern for two regions of the M≥2 light sensing regions $R_{[j]}$ are same, and
      the plurality of pixel positions $P_{[j,k]}$ such that for index k=x, where x is an arbitrary integer 1≤x≤N, each of the pixel positions $P_{[j,k=x]}$ is at an equivalent position within respective patterns of each of the M≥2 light sensing regions $R_{[j]}$; and
   generate the multiple parallax image data based on the image processing operation, wherein
      each parallax image data of the multiple parallax image data corresponds to a different pixel data of a plurality of sets of pixel data $D_{[k']}$, where k' is an index such that k'={1, 2, . . . , N} and each of the index k' specifies one of the plurality of sets of the pixel data $D_{[k']}$,
      each of the plurality of sets of the pixel data $D_{[k']}$ includes at least one pixel data, extracted from the light detection data corresponding to the plurality of pixels, and
      each parallax image data of the multiple parallax image data is generated by synthesizing synthesis of the extracted pixel data of a corresponding set of the plurality of sets of the pixel data $D_{[k']}$.

* * * * *